(12) United States Patent
Chen et al.

(10) Patent No.: US 9,703,073 B2
(45) Date of Patent: Jul. 11, 2017

(54) IMAGING LENS, AND ELECTRONIC APPARATUS INCLUDING THE SAME

(71) Applicant: Genius Electronic Optical Co., Ltd., Taichung (TW)

(72) Inventors: Shih-Han Chen, Taichung (TW); Chung-Chih Chang, Taichung (TW); Feng Chen, Xiamen (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 235 days.

(21) Appl. No.: 14/297,921

(22) Filed: Jun. 6, 2014

(65) Prior Publication Data

US 2015/0212297 A1 Jul. 30, 2015

(30) Foreign Application Priority Data

Jan. 27, 2014 (CN) .......................... 2014 1 0039616

(51) Int. Cl.
*G02B 13/18* (2006.01)
*G02B 13/00* (2006.01)
*G02B 9/60* (2006.01)

(52) U.S. Cl.
CPC ..... *G02B 13/0045* (2013.01); *G02B 13/0015* (2013.01); *G02B 9/60* (2013.01)

(58) Field of Classification Search
CPC . G02B 9/00; G02B 9/60; G02B 13/00; G02B 13/001; G02B 13/0015; G02B 13/002; G02B 13/0045; G02B 13/008; G02B 13/14
See application file for complete search history.

(56) References Cited

U.S. PATENT DOCUMENTS

| | | | |
|---|---|---|---|
| 7,911,712 B2 | 3/2011 | Kitahara et al. | |
| 8,179,615 B1 | 5/2012 | Tang et al. | |
| 8,345,323 B2 | 1/2013 | Otomo | |
| 8,451,545 B2 | 5/2013 | Hsieh et al. | |
| 2007/0273981 A1* | 11/2007 | Sato ......................... | G02B 9/16 359/690 |
| 2010/0254029 A1 | 10/2010 | Shinohara | |
| 2011/0273611 A1* | 11/2011 | Matsusaka ......... | G02B 13/0045 348/345 |
| 2011/0316969 A1 | 12/2011 | Hsieh et al. | |
| 2012/0162769 A1 | 6/2012 | Suzuki et al. | |
| 2012/0194922 A1 | 8/2012 | Tang et al. | |
| 2012/0218647 A1* | 8/2012 | Yonezawa .......... | G02B 13/0045 359/714 |
| 2013/0003195 A1* | 1/2013 | Kubota .............. | G02B 13/0045 359/764 |
| 2013/0016278 A1* | 1/2013 | Matsusaka ............. | G02B 13/18 348/360 |

(Continued)

FOREIGN PATENT DOCUMENTS

| | | |
|---|---|---|
| CN | 102472883 | 5/2012 |
| CN | 202631836 | 12/2012 |

(Continued)

*Primary Examiner* — Thong Nguyen
(74) *Attorney, Agent, or Firm* — Jianq Chyun IP Office

(57) ABSTRACT

An imaging lens includes first to fifth lens elements arranged from an object side to an image side in the given order. Through designs of surfaces of the lens elements and relevant lens parameters, a short system length of the imaging lens may be achieved while maintaining good optical performance.

16 Claims, 41 Drawing Sheets

(56) References Cited

U.S. PATENT DOCUMENTS

| | | | |
|---|---|---|---|
| 2013/0057967 A1 | 3/2013 | Tang et al. | |
| 2013/0107376 A1 | 5/2013 | Tsai et al. | |
| 2013/0114151 A1 | 5/2013 | Chen et al. | |
| 2013/0215524 A1* | 8/2013 | Kwon | G02B 9/60 359/764 |
| 2013/0242412 A1* | 9/2013 | Uchida | G02B 13/0045 359/714 |
| 2013/0258185 A1* | 10/2013 | Chang | G02B 13/0045 348/374 |
| 2013/0329307 A1* | 12/2013 | Jung | G02B 13/0045 359/714 |
| 2014/0293445 A1* | 10/2014 | Yoneyama | G02B 13/0045 359/714 |
| 2014/0293453 A1* | 10/2014 | Ogino | G02B 13/0045 359/714 |

FOREIGN PATENT DOCUMENTS

| | | |
|---|---|---|
| CN | 103257434 | 8/2013 |
| JP | H09218348 | 8/1997 |
| JP | 2000066103 | 3/2000 |
| JP | 2002196239 | 7/2002 |
| JP | 2008281760 A | 11/2008 |
| JP | 2010008562 A | 1/2010 |
| JP | 2010256608 A | 11/2010 |
| JP | 2013011710 | 1/2013 |
| JP | 2013011710 A | 1/2013 |
| JP | 2013195688 | 9/2013 |
| JP | 2015072424 | 4/2015 |
| JP | 2015135357 | 7/2015 |
| TW | 201213844 A | 4/2012 |
| TW | 201232021 A | 8/2012 |
| TW | 201234037 A | 8/2012 |
| TW | 201237455 A | 9/2012 |
| TW | 201239444 A | 10/2012 |
| TW | 201245758 A | 11/2012 |
| TW | 201248187 A | 12/2012 |
| TW | 201310061 A | 3/2013 |
| TW | 201314251 A | 4/2013 |
| TW | 201329498 A | 7/2013 |
| TW | 201329499 A | 7/2013 |
| TW | 201409066 A | 3/2014 |

* cited by examiner

| system focal length =3.633mm, half field-of-view =39.55°, F-number=1.8, system length=4.671mm | | | | | | |
|---|---|---|---|---|---|---|
| lens element | surface | radius of curvature | thickness | refractive index | Abbe number | material | focal length |
| object | | ∞ | ∞ | | | | |
| aperture stop 2 | | ∞ | -0.210 | | | | |
| first lens element 3 | object-side surface 31 | 1.869 | 0.693 | 1.544 | 56.114 | plastic | 2.812 |
| | image-side surface 32 | -7.475 | 0.054 | | | | |
| second lens element 4 | object-side surface 41 | 23.874 | 0.267 | 1.640 | 23.529 | plastic | -4.170 |
| | image-side surface 42 | 2.405 | 0.341 | | | | |
| third lens element 5 | object-side surface 51 | 3.671 | 0.403 | 1.544 | 56.114 | plastic | 22.298 |
| | image-side surface 52 | 5.052 | 0.342 | | | | |
| fourth lens element 6 | object-side surface 61 | -5.607 | 0.738 | 1.531 | 55.744 | plastic | 2.466 |
| | image-side surface 62 | -1.113 | 0.164 | | | | |
| fifth lens element 7 | object-side surface 71 | 5.231 | 0.531 | 1.531 | 55.744 | plastic | -2.283 |
| | image-side surface 72 | 0.952 | 0.500 | | | | |
| optical filter 8 | object-side surface 81 | ∞ | 0.210 | | | | |
| | image-side surface 82 | ∞ | 0.428 | | | | |
| image plane 9 | | | | | | | |

FIG.3

| surface | 31 | 32 | 41 | 42 | 51 |
|---|---|---|---|---|---|
| K | 0.000E+00 | 0.000E+00 | 0.000E+00 | 0.000E+00 | 0.000E+00 |
| a4 | -8.190E-03 | 8.159E-03 | -5.515E-02 | -1.009E-01 | -1.338E-01 |
| a6 | -2.006E-02 | 2.924E-02 | 2.564E-01 | 2.631E-01 | -5.167E-03 |
| a8 | -6.282E-04 | -8.871E-02 | -3.277E-01 | -2.300E-01 | 1.103E-01 |
| a10 | 1.875E-02 | 2.653E-03 | 1.311E-01 | 6.865E-02 | -1.131E-01 |
| a12 | -5.911E-02 | 2.621E-03 | -8.333E-03 | 5.672E-03 | 9.774E-03 |
| a14 | 4.683E-02 | 3.272E-02 | 2.949E-02 | 1.862E-02 | 4.536E-02 |
| a16 | -1.864E-02 | -1.845E-02 | -1.778E-02 | -1.354E-02 | -1.616E-02 |
| surface | 52 | 61 | 62 | 71 | 72 |
| K | 0.000E+00 | 0.000E+00 | -9.062E-01 | 0.000E+00 | -5.084E+00 |
| a4 | -4.656E-02 | 1.152E-01 | 2.236E-01 | -2.025E-01 | -9.798E-02 |
| a6 | -5.650E-02 | -1.372E-01 | -2.075E-01 | 4.933E-02 | 4.057E-02 |
| a8 | 2.110E-02 | 6.660E-02 | 1.253E-01 | 8.640E-05 | -1.268E-02 |
| a10 | 1.096E-02 | -1.332E-02 | -3.529E-02 | -1.041E-03 | 2.396E-03 |
| a12 | -6.593E-03 | 2.822E-03 | 3.413E-03 | -7.941E-06 | -2.631E-04 |
| a14 | -1.205E-02 | -7.546E-03 | 4.548E-04 | 2.391E-05 | 1.303E-05 |
| a16 | 7.680E-03 | 2.734E-03 | -1.177E-04 | -1.699E-06 | -5.441E-08 |

FIG.4

| system focal length =3.708mm, half field-of-view =38.980°, F-number=1.8, system length=4.773mm | | | | | | | |
|---|---|---|---|---|---|---|---|
| lens element | surface | radius of curvature | thickness | refractive index | Abbe number | material | focal length |
| object | | ∞ | ∞ | | | | |
| aperture stop 2 | | ∞ | -0.270 | | | | |
| first lens element 3 | object-side surface 31 | 1.869 | 0.583 | 1.544 | 56.114 | plastic | 2.918 |
| | image-side surface 32 | -9.600 | 0.061 | | | | |
| second lens element 4 | object-side surface 41 | 3.946 | 0.223 | 1.640 | 23.529 | plastic | -4.331 |
| | image-side surface 42 | 1.599 | 0.486 | | | | |
| third lens element 5 | object-side surface 51 | 14.093 | 0.566 | 1.544 | 56.114 | plastic | 17.207 |
| | image-side surface 52 | -27.771 | 0.427 | | | | |
| fourth lens element 6 | object-side surface 61 | -6.158 | 0.622 | 1.535 | 55.635 | plastic | 2.366 |
| | image-side surface 62 | -1.089 | 0.292 | | | | |
| fifth lens element 7 | object-side surface 71 | 8.485 | 0.377 | 1.535 | 55.635 | plastic | -2.086 |
| | image-side surface 72 | 0.973 | 0.500 | | | | |
| optical filter 8 | object-side surface 81 | ∞ | 0.210 | | | | |
| | image-side surface 82 | ∞ | 0.426 | | | | |
| image plane 9 | | ∞ | | | | | |

FIG.7

| surface | 31 | 32 | 41 | 42 | 51 |
|---|---|---|---|---|---|
| K | 0.000E+00 | 0.000E+00 | 0.000E+00 | 0.000E+00 | 0.000E+00 |
| a4 | -5.948E-03 | 4.909E-02 | -1.099E-01 | -1.697E-01 | -6.443E-02 |
| a6 | 2.534E-02 | -2.220E-02 | 1.773E-01 | 2.098E-01 | 5.188E-03 |
| a8 | -5.223E-02 | -2.218E-03 | -1.611E-01 | -1.577E-01 | 7.672E-04 |
| a10 | 4.378E-02 | 1.767E-03 | 5.040E-02 | 4.146E-02 | 1.047E-02 |
| a12 | -1.770E-02 | -2.505E-02 | -1.584E-02 | 8.553E-03 | -2.117E-03 |
| a14 | 8.828E-03 | 1.419E-02 | -2.252E-03 | -5.355E-03 | 2.846E-03 |
| a16 | -9.875E-03 | -4.276E-03 | 8.412E-03 | 1.314E-03 | -1.307E-03 |
| surface | 52 | 61 | 62 | 71 | 72 |
| K | 0.000E+00 | 0.000E+00 | -1.059E+00 | 0.000E+00 | -5.301E+00 |
| a4 | -2.228E-02 | 6.875E-02 | 2.456E-01 | -1.327E-01 | -8.669E-02 |
| a6 | -6.480E-02 | -7.005E-02 | -1.940E-01 | 3.002E-02 | 3.569E-02 |
| a8 | 5.105E-02 | 3.249E-02 | 1.013E-01 | 3.540E-05 | -1.121E-02 |
| a10 | -2.843E-02 | -1.086E-02 | -2.554E-02 | -3.998E-04 | 2.190E-03 |
| a12 | 1.044E-02 | 2.882E-03 | 2.396E-03 | -9.448E-05 | -2.658E-04 |
| a14 | -1.287E-03 | -4.369E-04 | 9.041E-05 | 2.976E-05 | 1.867E-05 |
| a16 | 3.679E-04 | 2.353E-05 | -2.231E-05 | -2.060E-06 | -6.029E-07 |

FIG.8 system focal length =3.522mm, half field-of-view =40.72°, F-number=1.8, system length=4.549mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.210 | | | | |
| first lens element 3 | object-side surface 31 | 1.844 | 0.692 | 1.544 | 56.114 | plastic | 2.803 |
| | image-side surface 32 | -7.786 | 0.056 | | | | |
| second lens element 4 | object-side surface 41 | 117.433 | 0.250 | 1.640 | 23.529 | plastic | -3.981 |
| | image-side surface 42 | 2.509 | 0.304 | | | | |
| third lens element 5 | object-side surface 51 | 3.254 | 0.428 | 1.544 | 56.114 | plastic | 13.175 |
| | image-side surface 52 | 5.668 | 0.339 | | | | |
| fourth lens element 6 | object-side surface 61 | -5.699 | 0.696 | 1.531 | 55.744 | plastic | 2.656 |
| | image-side surface 62 | -1.182 | 0.201 | | | | |
| fifth lens element 7 | object-side surface 71 | 4.517 | 0.491 | 1.531 | 55.744 | plastic | -2.382 |
| | image-side surface 72 | 0.953 | 0.500 | | | | |
| optical filter 8 | object-side surface 81 | ∞ | 0.210 | | | | |
| | image-side surface 82 | ∞ | 0.382 | | | | |
| image plane 9 | | ∞ | | | | | |

FIG.11

| surface | 31 | 32 | 41 | 42 | 51 |
|---|---|---|---|---|---|
| K | -1.852E-02 | -7.098E+00 | 4.398E+03 | -2.159E-01 | 1.322E-01 |
| a4 | -8.810E-03 | 2.206E-03 | -5.448E-02 | -1.026E-01 | -1.242E-01 |
| a6 | -2.037E-02 | 3.385E-02 | 2.569E-01 | 2.621E-01 | -2.598E-03 |
| a8 | -6.171E-04 | -8.933E-02 | -3.251E-01 | -2.284E-01 | 9.714E-02 |
| a10 | 1.823E-02 | 1.185E-03 | 1.322E-01 | 6.962E-02 | -1.087E-01 |
| a12 | -5.983E-02 | 2.277E-03 | -8.563E-03 | 6.325E-03 | 1.168E-02 |
| a14 | 4.700E-02 | 3.303E-02 | 2.918E-02 | 1.814E-02 | 4.758E-02 |
| a16 | -1.827E-02 | -1.770E-02 | -1.757E-02 | -1.358E-02 | -1.799E-02 |
| surface | 52 | 61 | 62 | 71 | 72 |
| K | -2.915E+00 | 4.956E+00 | -8.956E-01 | 9.419E-01 | -4.950E+00 |
| a4 | -4.013E-02 | 1.002E-01 | 2.194E-01 | -2.105E-01 | -1.007E-01 |
| a6 | -5.784E-02 | -1.207E-01 | -2.041E-01 | 4.992E-02 | 4.122E-02 |
| a8 | 2.350E-02 | 5.721E-02 | 1.261E-01 | 2.936E-04 | -1.288E-02 |
| a10 | 7.219E-03 | -1.256E-02 | -3.521E-02 | -1.041E-03 | 2.421E-03 |
| a12 | -6.858E-03 | 3.204E-03 | 2.987E-03 | -1.076E-05 | -2.572E-04 |
| a14 | -1.055E-02 | -7.305E-03 | 4.427E-04 | 2.225E-05 | 1.173E-05 |
| a16 | 8.042E-03 | 2.772E-03 | -8.541E-05 | -1.425E-06 | 2.543E-08 |

FIG.12

| lens element | surface | radius of curvature | thickness | refractive index | Abbe number | material | focal length |
|---|---|---|---|---|---|---|---|
| \multicolumn{8}{l}{system focal length =3.660mm, half field-of-view =39.340°, F-number=1.8, system length=4.638mm} | | | | | | | |
| object | | ∞ | ∞ | | | | |
| aperture stop 2 | | ∞ | -0.210 | | | | |
| first lens element 3 | object-side surface 31 | 1.847 | 0.706 | 1.544 | 56.114 | plastic | 2.910 |
| | image-side surface 32 | -9.820 | 0.054 | | | | |
| second lens element 4 | object-side surface 41 | 66.048 | 0.266 | 1.640 | 23.529 | plastic | -3.949 |
| | image-side surface 42 | 2.447 | 0.231 | | | | |
| third lens element 5 | object-side surface 51 | 2.743 | 0.314 | 1.544 | 56.114 | plastic | 12.196 |
| | image-side surface 52 | 4.476 | 0.532 | | | | |
| fourth lens element 6 | object-side surface 61 | -6.025 | 0.764 | 1.531 | 55.744 | plastic | 2.583 |
| | image-side surface 62 | -1.170 | 0.244 | | | | |
| fifth lens element 7 | object-side surface 71 | 5.666 | 0.473 | 1.531 | 55.744 | plastic | -2.273 |
| | image-side surface 72 | 0.969 | 0.500 | | | | |
| optical filter 8 | object-side surface 81 | ∞ | 0.210 | | | | |
| | image-side surface 82 | ∞ | 0.389 | | | | |
| image plane 9 | | ∞ | | | | | |

FIG.15

| surface | 31 | 32 | 41 | 42 | 51 |
|---|---|---|---|---|---|
| K | 0.000E+00 | 0.000E+00 | 0.000E+00 | 0.000E+00 | 0.000E+00 |
| a4 | -8.288E-03 | 2.108E-02 | -4.147E-02 | -1.072E-01 | -1.277E-01 |
| a6 | -1.164E-02 | 2.437E-02 | 2.531E-01 | 2.652E-01 | -7.133E-03 |
| a8 | -1.469E-03 | -8.887E-02 | -3.395E-01 | -2.301E-01 | 1.111E-01 |
| a10 | 1.844E-02 | 1.041E-03 | 1.339E-01 | 6.705E-02 | -1.140E-01 |
| a12 | -5.752E-02 | 3.681E-03 | -7.903E-03 | 5.124E-03 | 1.004E-02 |
| a14 | 4.917E-02 | 3.321E-02 | 2.895E-02 | 1.850E-02 | 4.579E-02 |
| a16 | -1.909E-02 | -1.799E-02 | -1.704E-02 | -1.268E-02 | -1.624E-02 |
| surface | 52 | 61 | 62 | 71 | 72 |
| K | 0.000E+00 | 0.000E+00 | -8.982E-01 | 0.000E+00 | -5.015E+00 |
| a4 | -3.170E-02 | 8.608E-02 | 2.122E-01 | -1.963E-01 | -9.846E-02 |
| a6 | -5.056E-02 | -1.186E-01 | -2.058E-01 | 5.070E-02 | 4.168E-02 |
| a8 | 2.006E-02 | 6.970E-02 | 1.207E-01 | -1.706E-04 | -1.294E-02 |
| a10 | 1.127E-02 | -2.928E-02 | -3.318E-02 | -1.461E-03 | 2.508E-03 |
| a12 | -4.554E-03 | 1.843E-02 | 1.979E-03 | 9.464E-05 | -2.963E-04 |
| a14 | -1.121E-02 | -1.219E-02 | 1.139E-03 | 2.013E-05 | 1.850E-05 |
| a16 | 7.631E-03 | 2.842E-03 | -2.245E-04 | -2.121E-06 | -4.279E-07 |

FIG.16

| system focal length =3.618mm, half field-of-view =39.670°, F-number=1.8, system length=4.687mm |||||||
|---|---|---|---|---|---|---|
| lens element | surface | radius of curvature | thickness | refractive index | Abbe number | material | focal length |
| object | | ∞ | ∞ | | | | |
| aperture stop 2 | | ∞ | -0.210 | | | | |
| first lens element 3 | object-side surface 31 | 1.864 | 0.627 | 1.544 | 56.114 | plastic | 2.875 |
| | image-side surface 32 | -8.764 | 0.054 | | | | |
| second lens element 4 | object-side surface 41 | 6.209 | 0.199 | 1.640 | 23.529 | plastic | -4.530 |
| | image-side surface 42 | 1.961 | 0.509 | | | | |
| third lens element 5 | object-side surface 51 | 5.057 | 0.372 | 1.544 | 56.114 | plastic | 340.260 |
| | image-side surface 52 | 5.063 | 0.337 | | | | |
| fourth lens element 6 | object-side surface 61 | -9.413 | 0.765 | 1.535 | 55.635 | plastic | 2.274 |
| | image-side surface 62 | -1.104 | 0.252 | | | | |
| fifth lens element 7 | object-side surface 71 | 3.214 | 0.395 | 1.535 | 55.635 | plastic | -2.279 |
| | image-side surface 72 | 0.844 | 0.500 | | | | |
| optical filter 8 | object-side surface 81 | ∞ | 0.210 | | | | |
| | image-side surface 82 | ∞ | 0.467 | | | | |
| image plane 9 | | | | | | | |

FIG.19

| surface | 31 | 32 | 41 | 42 | 51 |
|---|---|---|---|---|---|
| K | 0.000E+00 | 0.000E+00 | 0.000E+00 | 0.000E+00 | 0.000E+00 |
| a4 | -5.550E-03 | 2.219E-02 | -9.234E-02 | -1.265E-01 | -1.316E-01 |
| a6 | -1.072E-02 | 2.331E-02 | 2.728E-01 | 2.547E-01 | -1.972E-02 |
| a8 | -3.021E-03 | -7.489E-02 | -3.330E-01 | -2.279E-01 | 1.263E-01 |
| a10 | 1.851E-02 | -5.174E-03 | 1.245E-01 | 7.112E-02 | -1.113E-01 |
| a12 | -5.577E-02 | -1.612E-03 | -8.451E-03 | 5.021E-03 | 2.318E-03 |
| a14 | 4.683E-02 | 3.287E-02 | 3.028E-02 | 1.726E-02 | 4.234E-02 |
| a16 | -2.115E-02 | -1.758E-02 | -1.593E-02 | -1.230E-02 | -1.364E-02 |
| surface | 52 | 61 | 62 | 71 | 72 |
| K | 0.000E+00 | 0.000E+00 | -1.017E+00 | 0.000E+00 | -4.180E+00 |
| a4 | -7.907E-02 | 9.443E-02 | 2.461E-01 | -2.092E-01 | -1.099E-01 |
| a6 | -4.362E-02 | -1.071E-01 | -2.230E-01 | 4.804E-02 | 4.474E-02 |
| a8 | 2.002E-02 | 4.016E-02 | 1.284E-01 | -1.880E-04 | -1.328E-02 |
| a10 | 5.056E-03 | -9.933E-03 | -3.835E-02 | -1.027E-03 | 2.382E-03 |
| a12 | -1.174E-03 | 7.288E-03 | 3.949E-03 | 1.888E-06 | -2.566E-04 |
| a14 | -1.043E-02 | -6.693E-03 | 6.615E-04 | 2.529E-05 | 1.589E-05 |
| a16 | 5.401E-03 | 1.704E-03 | -1.530E-04 | -2.023E-06 | -4.606E-07 |

FIG.20

| system focal length =3.546mm , half field-of-view =40.230°, F-number=1.8, system length=4.452mm | | | | | | |
|---|---|---|---|---|---|---|
| lens element | surface | radius of curvature | thickness | refractive index | Abbe number | material | focal length |
| object | | ∞ | ∞ | | | | |
| aperture stop 2 | | ∞ | -0.210 | | | | |
| first lens element 3 | object-side surface 31 | 1.826 | 0.635 | 1.544 | 56.114 | plastic | 2.876 |
| | image-side surface 32 | -9.810 | 0.070 | | | | |
| second lens element 4 | object-side surface 41 | 61.826 | 0.250 | 1.640 | 23.529 | plastic | -4.039 |
| | image-side surface 42 | 2.494 | 0.290 | | | | |
| third lens element 5 | object-side surface 51 | 3.105 | 0.438 | 1.544 | 56.114 | plastic | 13.081 |
| | image-side surface 52 | 5.220 | 0.367 | | | | |
| fourth lens element 6 | object-side surface 61 | -5.996 | 0.638 | 1.535 | 55.635 | plastic | 2.581 |
| | image-side surface 62 | -1.166 | 0.389 | | | | |
| fifth lens element 7 | object-side surface 71 | 7.826 | 0.290 | 1.535 | 55.635 | plastic | -2.523 |
| | image-side surface 72 | 1.070 | 0.500 | | | | |
| optical filter 8 | object-side surface 81 | ∞ | 0.210 | | | | |
| | image-side surface 82 | ∞ | 0.375 | | | | |
| image plane 9 | | | | | | | |

FIG.23

| surface | 31 | 32 | 41 | 42 | 51 |
|---|---|---|---|---|---|
| K | 2.453E-02 | -1.981E+01 | 2.915E+02 | -5.824E-02 | 8.275E-01 |
| a4 | -5.397E-03 | -5.204E-03 | -5.280E-02 | -1.011E-01 | -1.343E-01 |
| a6 | -3.225E-02 | 3.710E-02 | 2.520E-01 | 2.689E-01 | 1.979E-02 |
| a8 | 1.271E-02 | -8.957E-02 | -3.124E-01 | -2.348E-01 | 7.286E-02 |
| a10 | 9.735E-03 | 3.664E-03 | 1.320E-01 | 7.310E-02 | -1.071E-01 |
| a12 | -6.469E-02 | -5.648E-06 | -1.043E-02 | 8.796E-03 | 2.165E-02 |
| a14 | 5.102E-02 | 3.060E-02 | 2.811E-02 | 1.869E-02 | 4.815E-02 |
| a16 | -1.960E-02 | -1.709E-02 | -1.751E-02 | -1.564E-02 | -2.036E-02 |
| surface | 52 | 61 | 62 | 71 | 72 |
| K | 4.371E+00 | 3.287E+00 | -8.872E-01 | -3.939E-02 | -5.547E+00 |
| a4 | -5.703E-02 | 5.665E-02 | 2.078E-01 | -1.954E-01 | -1.096E-01 |
| a6 | -3.466E-02 | -9.126E-02 | -1.888E-01 | 4.616E-02 | 4.198E-02 |
| a8 | 2.517E-03 | 5.959E-02 | 1.188E-01 | 2.527E-04 | -1.264E-02 |
| a10 | 1.569E-02 | -2.019E-02 | -3.175E-02 | -8.616E-04 | 2.333E-03 |
| a12 | -1.006E-02 | 3.133E-03 | 2.441E-03 | -1.087E-05 | -2.476E-04 |
| a14 | -1.215E-02 | -8.812E-03 | 1.684E-04 | 1.392E-05 | 1.014E-05 |
| a16 | 9.890E-03 | 3.896E-03 | -1.396E-05 | -5.088E-07 | 2.275E-07 |

| system focal length =3.552mm , half field-of-view =40.190°,  F-number=1.8, system length=4.438mm | | | | | | |
|---|---|---|---|---|---|---|
| lens element | surface | radius of curvature | thickness | refractive index | Abbe number | material | focal length |
| object | | ∞ | ∞ | | | | |
| aperture stop 2 | | ∞ | -0.210 | | | | |
| first lens element 3 | object-side surface 31 | 1.826 | 0.635 | 1.544 | 56.114 | plastic | 2.881 |
| | image-side surface 32 | -9.945 | 0.070 | | | | |
| second lens element 4 | object-side surface 41 | 45.063 | 0.250 | 1.640 | 23.529 | plastic | -4.012 |
| | image-side surface 42 | 2.441 | 0.307 | | | | |
| third lens element 5 | object-side surface 51 | 3.413 | 0.463 | 1.544 | 56.114 | plastic | 13.443 |
| | image-side surface 52 | 6.075 | 0.445 | | | | |
| fourth lens element 6 | object-side surface 61 | -4.419 | 0.387 | 1.535 | 55.635 | plastic | 2.701 |
| | image-side surface 62 | -1.124 | 0.237 | | | | |
| fifth lens element 7 | object-side surface 71 | 5.895 | 0.461 | 1.535 | 55.635 | plastic | -2.565 |
| | image-side surface 72 | 1.085 | 0.500 | | | | |
| optical filter 8 | object-side surface 81 | ∞ | 0.210 | | | | |
| | image-side surface 82 | ∞ | 0.47300 | | | | |
| image plane 9 | | ∞ | | | | | |

| surface | 31 | 32 | 41 | 42 | 51 |
|---|---|---|---|---|---|
| K | 3.017E-02 | -3.062E+01 | -1.142E+02 | -7.407E-02 | 9.429E-01 |
| a4 | -5.094E-03 | -4.693E-03 | -5.383E-02 | -1.018E-01 | -1.345E-01 |
| a6 | -3.223E-02 | 3.679E-02 | 2.520E-01 | 2.706E-01 | 2.007E-02 |
| a8 | 1.247E-02 | -8.872E-02 | -3.120E-01 | -2.350E-01 | 7.243E-02 |
| a10 | 9.823E-03 | 4.203E-03 | 1.322E-01 | 7.263E-02 | -1.075E-01 |
| a12 | -6.433E-02 | 5.337E-05 | -1.041E-02 | 8.615E-03 | 2.144E-02 |
| a14 | 5.141E-02 | 3.046E-02 | 2.803E-02 | 1.874E-02 | 4.815E-02 |
| a16 | -1.939E-02 | -1.703E-02 | -1.753E-02 | -1.561E-02 | -2.021E-02 |
| surface | 52 | 61 | 62 | 71 | 72 |
| K | -3.174E+00 | -4.362E+00 | -9.228E-01 | 1.194E+00 | -5.662E+00 |
| a4 | -6.663E-02 | 6.363E-02 | 2.126E-01 | -1.941E-01 | -1.059E-01 |
| a6 | -3.416E-02 | -9.734E-03 | -1.876E-01 | 4.626E-02 | 4.147E-02 |
| a8 | 2.655E-03 | 5.751E-02 | 1.188E-01 | 2.407E-04 | -1.269E-02 |
| a10 | 1.525E-02 | -2.042E-02 | -3.179E-02 | -8.649E-04 | 2.329E-03 |
| a12 | -1.043E-02 | 3.126E-03 | 2.440E-03 | -1.185E-05 | -2.478E-04 |
| a14 | -1.232E-02 | -8.783E-03 | 1.754E-04 | 1.377E-05 | 1.012E-05 |
| a16 | 9.845E-03 | 3.923E-03 | -8.823E-06 | -5.320E-07 | 2.292E-07 |

FIG.28

| system focal length =3.408mm, half field-of-view =41.360°, F-number=1.8, system length=4.506mm | | | | | | | |
|---|---|---|---|---|---|---|---|
| lens element | surface | radius of curvature | thickness | refractive index | Abbe number | material | focal length |
| object | | ∞ | ∞ | | | | |
| aperture stop 2 | | ∞ | −0.210 | | | | |
| first lens element 3 | object-side surface 31 | 1.861 | 0.518 | 1.546 | 56.114 | plastic | 2.919 |
| | image-side surface 32 | −9.995 | 0.070 | | | | |
| second lens element 4 | object-side surface 41 | 23.894 | 0.250 | 1.645 | 23.528 | plastic | −4.100 |
| | image-side surface 42 | 2.371 | 0.315 | | | | |
| third lens element 5 | object-side surface 51 | 3.100 | 0.439 | 1.645 | 23.528 | plastic | 12.364 |
| | image-side surface 52 | 5.447 | 0.394 | | | | |
| fourth lens element 6 | object-side surface 61 | −5.749 | 0.637 | 1.546 | 56.114 | plastic | 2.535 |
| | image-side surface 62 | −1.142 | 0.117 | | | | |
| fifth lens element 7 | object-side surface 71 | 5.420 | 0.569 | 1.546 | 56.114 | plastic | −2.583 |
| | image-side surface 72 | 1.063 | 0.500 | | | | |
| optical filter 8 | object-side surface 81 | ∞ | 0.210 | | | | |
| | image-side surface 82 | ∞ | 0.487 | | | | |
| image plane 9 | | | | | | | |

FIG.31

| surface | 31 | 32 | 41 | 42 | 51 |
|---|---|---|---|---|---|
| K | -2.227E-02 | -5.006E+01 | 3.598E+02 | -1.444E-01 | 1.182E+00 |
| a4 | -7.441E-03 | -1.906E-03 | -5.019E-02 | -1.014E-01 | -1.282E-01 |
| a6 | -3.382E-02 | 3.876E-02 | 2.552E-01 | 2.670E-01 | 1.772E-02 |
| a8 | 9.918E-03 | -9.029E-02 | -3.105E-01 | -2.363E-01 | 7.179E-02 |
| a10 | 7.077E-03 | 2.207E-03 | 1.325E-01 | 7.233E-02 | -1.075E-01 |
| a12 | -6.693E-02 | -2.138E-03 | -1.058E-02 | 8.419E-03 | 2.142E-02 |
| a14 | 4.912E-02 | 2.910E-02 | 2.756E-02 | 1.833E-02 | 4.798E-02 |
| a16 | -2.133E-02 | -1.828E-02 | -1.838E-02 | -1.622E-02 | -2.045E-02 |
| surface | 52 | 61 | 62 | 71 | 72 |
| K | 4.499E+00 | -5.987E+00 | -8.781E-01 | 1.066E+00 | -5.056E+00 |
| a4 | -5.673E-02 | 6.374E-02 | 2.038E-01 | -1.941E-01 | -1.036E-01 |
| a6 | -3.413E-02 | -9.522E-02 | -1.877E-01 | 4.630E-02 | 4.162E-02 |
| a8 | 2.032E-03 | 5.906E-02 | 1.189E-01 | 2.536E-04 | -1.267E-02 |
| a10 | 1.512E-02 | -1.991E-02 | -3.175E-02 | -8.624E-04 | 2.332E-03 |
| a12 | -1.028E-02 | 3.224E-03 | 2.453E-03 | -1.152E-05 | -2.473E-04 |
| a14 | -1.211E-02 | -8.819E-03 | 1.766E-04 | 1.384E-05 | 1.019E-05 |
| a16 | 1.005E-02 | 3.873E-03 | -1.062E-05 | -5.396E-07 | 2.330E-07 |

FIG.32 system focal length =3.485mm, half field-of-view =40.720°, F-number=2.20, system length=4.620mm

| lens element | surface | radius of curvature | thickness | refractive index | Abbe number | material | focal length |
|---|---|---|---|---|---|---|---|
| object | | ∞ | ∞ | | | | |
| first lens element 3 | object-side surface 31 | 2.377 | 0.553 | 1.546 | 56.114 | plastic | 2.862 |
| | image-side surface 32 | -4.502 | 0.030 | | | | |
| aperture stop 2 | | ∞ | 0.047 | | | | |
| second lens element 4 | object-side surface 41 | 4.240 | 0.250 | 1.640 | 23.529 | plastic | -3.485 |
| | image-side surface 42 | 1.403 | 0.193 | | | | |
| third lens element 5 | object-side surface 51 | 3.637 | 0.459 | 1.535 | 55.712 | plastic | 6.363 |
| | image-side surface 52 | -13.113 | 0.458 | | | | |
| fourth lens element 6 | object-side surface 61 | -1.232 | 0.506 | 1.535 | 55.712 | plastic | 2.485 |
| | image-side surface 62 | -0.777 | 0.135 | | | | |
| fifth lens element 7 | object-side surface 71 | 3.939 | 0.583 | 1.531 | 55.744 | plastic | -2.400 |
| | image-side surface 72 | 1.020 | 0.346 | | | | |
| optical filter 8 | object-side surface 81 | ∞ | 0.300 | | | | |
| | image-side surface 82 | ∞ | 0.760 | | | | |
| image plane 9 | | ∞ | | | | | |

FIG.35

| surface | 31 | 32 | 41 | 42 | 51 |
|---|---|---|---|---|---|
| K | 0.000E+00 | 0.000E+00 | 0.000E+00 | 0.000E+00 | 6.481E+00 |
| a4 | -1.273E-02 | 8.196E-02 | -1.003E-01 | -2.881E-01 | -7.985E-02 |
| a6 | -5.878E-02 | -5.060E-02 | 2.639E-01 | 3.403E-01 | -2.260E-02 |
| a8 | 5.884E-02 | -6.135E-03 | -1.603E-01 | -1.972E-01 | 8.943E-02 |
| a10 | -3.134E-02 | -2.389E-04 | -2.502E-01 | -1.022E-01 | -2.071E-01 |
| a12 | | 0.000E+00 | 2.536E-01 | 7.425E-02 | 3.729E-01 |
| a14 | | | | | |
| a16 | | | | | -2.142E-01 |

| surface | 52 | 61 | 62 | 71 | 72 |
|---|---|---|---|---|---|
| K | -2.043E+01 | 0.000E+00 | -2.845E+00 | 5.552E-01 | -7.318E+00 |
| a4 | -2.405E-02 | 1.356E-01 | -1.297E-01 | -7.933E-02 | -4.931E-02 |
| a6 | 2.276E-02 | -3.027E-02 | 1.055E-01 | 1.743E-02 | 1.225E-02 |
| a8 | -1.542E-01 | 2.067E-01 | 1.575E-02 | -1.382E-03 | -2.533E-03 |
| a10 | 1.242E-01 | -2.334E-01 | -6.568E-03 | -2.742E-05 | 2.255E-04 |
| a12 | -1.113E-01 | 2.329E-02 | -6.723E-03 | 4.207E-06 | 3.917E-06 |
| a14 | 1.010E-01 | 5.422E-02 | 3.088E-04 | 6.527E-07 | -1.505E-06 |
| a16 | | -2.471E-03 | 4.885E-04 | -4.494E-08 | 6.350E-08 |

FIG.36

| relationship | first preferred embodiment | second preferred embodiment | third preferred embodiment | fourth preferred embodiment | fifth preferred embodiment | sixth preferred embodiment | seventh preferred embodiment | eighth preferred embodiment | ninth preferred embodiment |
|---|---|---|---|---|---|---|---|---|---|
| T1 | 0.693 | 0.583 | 0.692 | 0.706 | 0.627 | 0.635 | 0.635 | 0.518 | 0.553 |
| G12 | 0.054 | 0.061 | 0.056 | 0.054 | 0.054 | 0.070 | 0.070 | 0.070 | 0.077 |
| T2 | 0.267 | 0.223 | 0.250 | 0.266 | 0.199 | 0.250 | 0.250 | 0.250 | 0.250 |
| G23 | 0.341 | 0.486 | 0.304 | 0.231 | 0.509 | 0.290 | 0.307 | 0.315 | 0.193 |
| T3 | 0.403 | 0.566 | 0.428 | 0.314 | 0.372 | 0.438 | 0.463 | 0.439 | 0.459 |
| G34 | 0.342 | 0.427 | 0.339 | 0.532 | 0.337 | 0.367 | 0.445 | 0.394 | 0.458 |
| T4 | 0.738 | 0.622 | 0.696 | 0.764 | 0.765 | 0.638 | 0.387 | 0.637 | 0.506 |
| G45 | 0.164 | 0.292 | 0.201 | 0.244 | 0.252 | 0.389 | 0.237 | 0.117 | 0.135 |
| T5 | 0.531 | 0.377 | 0.491 | 0.473 | 0.395 | 0.290 | 0.461 | 0.569 | 0.583 |
| BFL | 1.138 | 1.136 | 1.092 | 1.099 | 1.177 | 1.085 | 1.183 | 1.197 | 1.406 |
| EFL | 3.633 | 3.708 | 3.522 | 3.660 | 3.618 | 3.546 | 3.552 | 3.408 | 3.485 |
| Gaa | 0.901 | 1.266 | 0.900 | 1.061 | 1.152 | 1.116 | 1.059 | 0.896 | 0.863 |
| ALT | 2.632 | 2.371 | 2.557 | 2.523 | 2.358 | 2.251 | 2.196 | 2.413 | 2.351 |
| TTL | 4.671 | 4.773 | 4.549 | 4.683 | 4.687 | 4.452 | 4.438 | 4.506 | 4.620 |

FIG.38

| relationship | first preferred embodiment | second preferred embodiment | third preferred embodiment | fourth preferred embodiment | fifth preferred embodiment | sixth preferred embodiment | seventh preferred embodiment | eighth preferred embodiment | ninth preferred embodiment |
|---|---|---|---|---|---|---|---|---|---|
| ALT/G34 | 7.696 | 5.553 | 7.543 | 4.742 | 6.997 | 6.134 | 4.935 | 6.124 | 5.133 |
| BFL/G45 | 6.939 | 3.890 | 5.433 | 4.504 | 4.671 | 2.789 | 4.992 | 10.231 | 10.415 |
| EFL/T5 | 6.842 | 9.836 | 7.173 | 7.738 | 9.159 | 12.228 | 7.705 | 5.989 | 5.978 |
| Gaa/T5 | 1.697 | 3.358 | 1.833 | 2.243 | 2.916 | 3.848 | 2.297 | 1.575 | 1.480 |
| EFL/T4 | 4.923 | 5.961 | 5.060 | 4.791 | 4.729 | 5.558 | 9.178 | 5.350 | 6.887 |
| BFL/T4 | 1.542 | 1.826 | 1.569 | 1.438 | 1.539 | 1.701 | 3.057 | 1.879 | 2.779 |
| ALT/G45 | 16.049 | 8.120 | 12.721 | 10.340 | 9.357 | 5.787 | 9.266 | 20.624 | 17.415 |
| T5/G45 | 3.238 | 1.291 | 2.443 | 1.939 | 1.567 | 0.746 | 1.945 | 4.863 | 4.319 |
| BFL/T1 | 1.642 | 1.949 | 1.578 | 1.557 | 1.877 | 1.709 | 1.863 | 2.311 | 2.542 |
| BFL/G34 | 3.327 | 2.660 | 3.221 | 2.066 | 3.493 | 2.956 | 2.658 | 3.038 | 3.070 |
| EFL/G45 | 22.152 | 12.699 | 17.522 | 15.000 | 14.357 | 9.116 | 14.987 | 29.128 | 25.815 |
| BFL/T3 | 2.824 | 2.007 | 2.551 | 3.500 | 3.164 | 2.477 | 2.555 | 2.727 | 3.063 |
| T5/T1 | 0.766 | 0.647 | 0.710 | 0.670 | 0.630 | 0.457 | 0.726 | 1.098 | 1.054 |

FIG.39

IMAGING LENS, AND ELECTRONIC APPARATUS INCLUDING THE SAME

CROSS-REFERENCE TO RELATED APPLICATION

This application claims priority to Chinese Application No. 201410039616.X, filed on Jan. 27, 2014.

BACKGROUND OF THE INVENTION

1. Field of the Invention

The present invention relates to an imaging lens and an electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

Each of U.S. patent application publication nos. 20110316969, 20100254029, 20130107376 and 20130057967, U.S. Pat. Nos. 8,345,323 and 7,911,712, and Japanese patent publication no. 2008-281760 discloses a conventional imaging lens that includes five lens elements, and that has a system length of over 10 mm. Particularly, the imaging lens disclosed in U.S. patent application publication no. 20110316969 has a system length of over 14 mm, which disfavors reducing thickness of portable electronic devices, such as mobile phones and digital cameras.

Reducing the system length of the imaging lens while maintaining satisfactory optical performance is always a goal in the industry.

SUMMARY OF THE INVENTION

Therefore, an object of the present invention is to provide an imaging lens having a shorter overall length while maintaining good optical performance.

According to one aspect of the present invention, an imaging lens includes a first lens element, a second lens element, a third lens element, a fourth lens element and a fifth lens element arranged in order from an object side to an image side along an optical axis of the imaging lens. Each of the first lens element, the second lens element, the third lens element, the fourth lens element and the fifth lens element has a refractive power, an object-side surface facing toward the object side, and an image-side surface facing toward the image side.

The image-side surface of the first lens element has a convex portion in a vicinity of a periphery of the first lens element.

The object-side surface of the second lens element has a convex portion in a vicinity of a periphery of the second lens element, and the image-side surface of the second lens element has a concave portion in a vicinity of the optical axis.

The image-side surface of the third lens element has a concave portion in a vicinity of a periphery of the third lens element.

The object-side surface of the fourth lens element has a concave portion in a vicinity of the optical axis.

The fifth lens element is made of a plastic material, and the image-side surface of the fifth lens element has a concave portion in a vicinity of the optical axis.

The imaging lens does not include any lens element with a refractive power other than the first lens element, the second lens element, the third lens element, the fourth lens element and the fifth lens element.

The imaging lens satisfies ALT/G34≤7.7, where ALT represents a sum of thicknesses of the first lens element, the second lens element, the third lens element, the fourth lens element and the fifth lens element at the optical axis, and G34 represents an air gap length between the third lens element and the fourth lens element at the optical axis.

Another object of the present invention is to provide an electronic apparatus having an imaging lens with five lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical data corresponding to the imaging lens of the first preferred embodiment;

FIG. 4 shows values of some aspherical coefficients corresponding to the imaging lens of the first preferred embodiment;

FIG. 7 shows values of some optical data corresponding to the imaging lens of the second preferred embodiment;

FIG. 8 shows values of some aspherical coefficients corresponding to the imaging lens of the second preferred embodiment;

FIG. 11 shows values of some optical data corresponding to the imaging lens of the third preferred embodiment;

FIG. 12 shows values of some aspherical coefficients corresponding to the imaging lens of the third preferred embodiment;

FIG. 15 shows values of some optical data corresponding to the imaging lens of the fourth preferred embodiment;

FIG. 16 shows values of some aspherical coefficients corresponding to the imaging lens of the fourth preferred embodiment;

FIG. 19 shows values of some optical data corresponding to the imaging lens of the fifth preferred embodiment;

FIG. 20 shows values of some aspherical coefficients corresponding to the imaging lens of the fifth preferred embodiment;

FIG. 23 shows values of some optical data corresponding to the imaging lens of the sixth preferred embodiment;

FIG. 24 shows values of some aspherical coefficients corresponding to the imaging lens of the sixth preferred embodiment;

FIG. 27 shows values of some optical data corresponding to the imaging lens of the seventh preferred embodiment;

FIG. 28 shows values of some aspherical coefficients corresponding to the imaging lens of the seventh preferred embodiment;

FIG. 31 shows values of some optical data corresponding to the imaging lens of the eighth preferred embodiment;

FIG. 32 shows values of some aspherical coefficients corresponding to the imaging lens of the eighth preferred embodiment;

FIG. 35 shows values of some optical data corresponding to the imaging lens of the ninth preferred embodiment;

FIG. 36 shows values of some aspherical coefficients corresponding to the imaging lens of the ninth preferred embodiment;

FIG. 38 is a table that lists values of relationships among some lens parameters corresponding to the imaging lenses of the first to ninth preferred embodiments;

FIG. 39 is a table that lists values of relationships among some lens parameters corresponding to the imaging lenses of the first to ninth preferred embodiments;

DETAILED DESCRIPTION OF THE PREFERRED EMBODIMENTS

Figure 1:
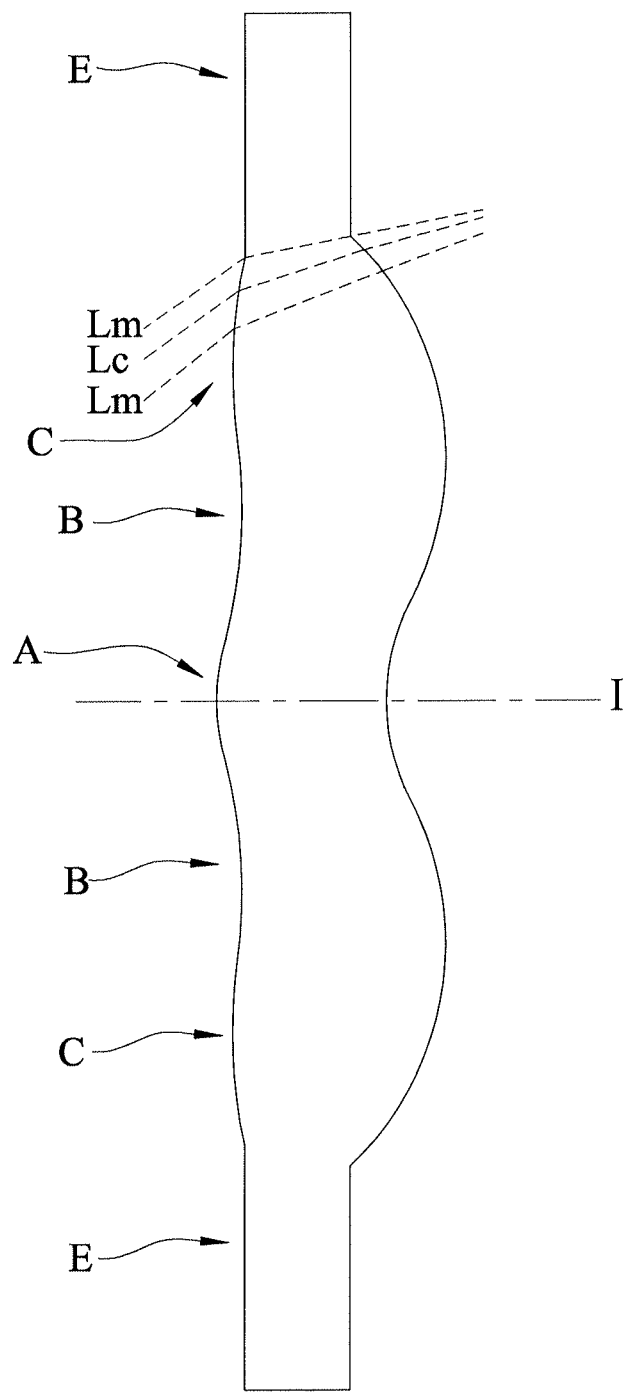
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to the certain area, the certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
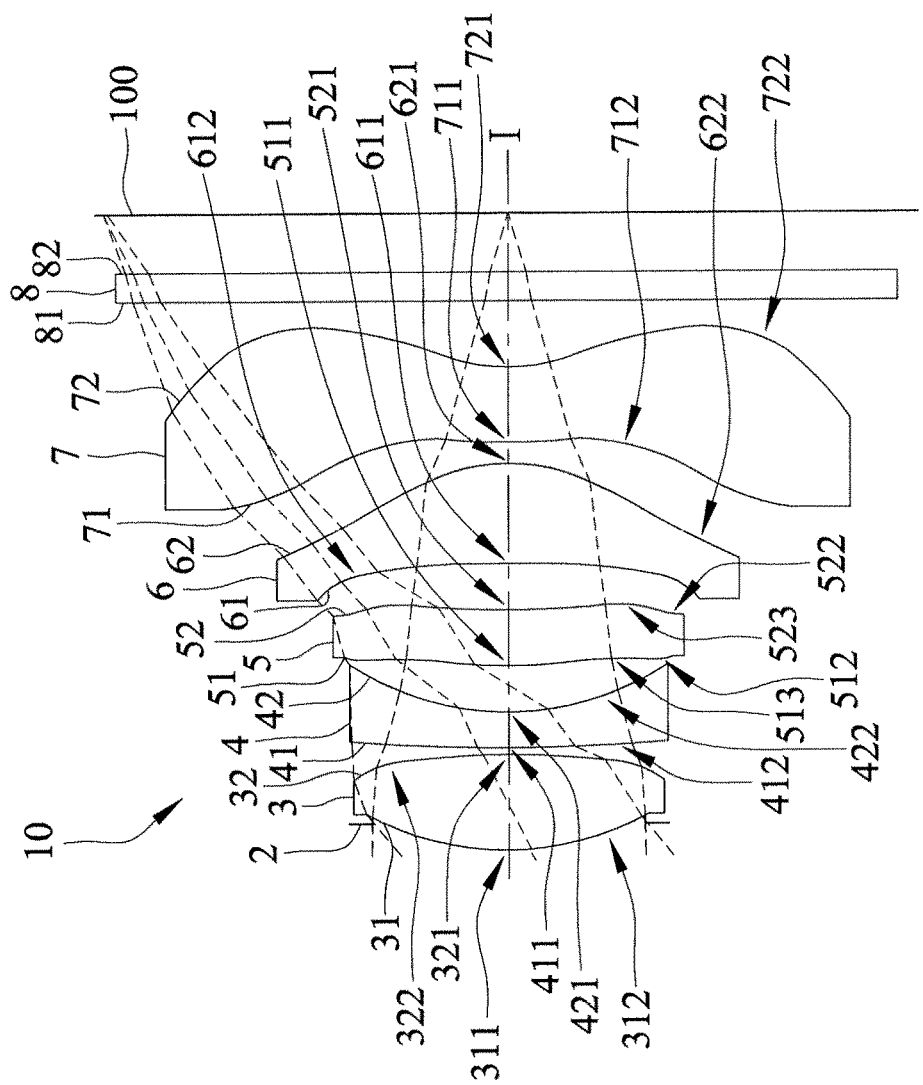
FIG. 2 is a schematic diagram that illustrates the first preferred embodiment of an imaging lens according to the present invention.

Referring to FIG. 2, the first preferred embodiment of an imaging lens 10 according to the present invention includes an aperture stop 2, a first lens element 3, a second lens element 4, a third lens element 5, a fourth lens element 6, a fifth lens element 7, and an optical filter 8 arranged in the given order along an optical axis (I) from an object side to an image side. The optical filter 8 is an infrared cut filter for selectively absorbing infrared light to thereby reduce imperfection of images formed at an image plane 100.

Each of the first, second, third, fourth and fifth lens elements 3-7 and the optical filter 8 has an object-side surface 31, 41, 51, 61, 71, 81 facing toward the object side, and an image-side surface 32, 42, 52, 62, 72, 82 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, the object-side and image-side surfaces 71, 72 of the fifth lens element 7, and the object-side and image-side surfaces 81, 82 of the optical filter 8, in the given order, to form an image on the image plane 100. Each of the object-side surfaces 31, 41, 51, 61, 71 and the image-side surfaces 32, 42, 52, 62, 72 is aspherical and has a center point coinciding with the optical axis (I).

Each of the lens elements 3-7 is made of a plastic material and has a refractive power in this embodiment. However, at least one of the lens elements 3-6 may be made of other materials in other embodiments.

In the first preferred embodiment, which is depicted in FIG. 2, the first lens element 3 has a positive refractive power. The object-side surface 31 of the first lens element 3 is a convex surface that has a convex portion 311 in a vicinity of the optical axis (I) and that has a convex portion 312 in a vicinity of a periphery of the first lens element 3. The image-side surface 32 of the first lens element 3 is a convex surface that has a convex portion 321 in a vicinity of the optical axis (I), and a convex portion 322 in a vicinity of the periphery of the first lens element 3.

The second lens element 4 has a negative refractive power. The object-side surface 41 of the second lens element 4 is a convex surface that has a convex portion 411 in a vicinity of the optical axis (I), and a convex portion 412 in a vicinity of a periphery of the second lens element 4. The image-side surface 42 of the second lens element 4 is a concave surface that has a concave portion 421 in a vicinity of the optical axis (I), and a concave portion 422 in a vicinity of the periphery of the second lens element 4.

The third lens element 5 has a positive refractive power. The object-side surface 51 of the third lens element 5 has a convex portion 511 in a vicinity of the optical axis (I), a convex portion 512 in a vicinity of a periphery of the third lens element 5, and a concave portion 513 disposed between the convex portion 511 and the convex portion 512. The image-side surface 52 of the third lens element 5 has a concave portion 521 in a vicinity of the optical axis (I), a concave portion 522 in a vicinity of the periphery of the third lens element 5, and a convex portion 523 disposed between the concave portion 521 and the concave portion 522.

The fourth lens element 6 has a positive refractive power. The object-side surface 61 of the fourth lens element 6 is a concave surface that has a concave portion 611 in a vicinity of the optical axis (I), and a concave portion 612 in a vicinity of a periphery of the fourth lens element 6. The image-side surface 62 of the fourth lens element 6 is a convex surface that has a convex portion 621 in a vicinity of the optical axis (I), and a convex portion 622 in a vicinity of the periphery of the fourth lens element 6.

The fifth lens element 7 has a negative refractive power. The object-side surface 71 of the fifth lens element 7 has a convex portion 711 in a vicinity of the optical axis (I), and a concave portion 712 in a vicinity of a periphery of the fifth lens element 7. The image-side surface 72 of the fifth lens element 7 has a concave portion 721 in a vicinity of the optical axis (I), and a convex portion 722 in a vicinity of the periphery of the fifth lens element 7.

In the first preferred embodiment, the imaging lens 10 does not include any lens element with a refractive power other than the aforesaid lens elements 3-7.

Shown in FIG. 3 is a table that lists values of some optical data corresponding to the surfaces 31-81, 32-82 of the first preferred embodiment. The imaging lens 10 has an overall system effective focal length (EFL) of 3.633 mm, a half field-of-view (HFOV) of 39.55°, an F-number of 1.8, and a system length (TTL) of 4.671 mm. The system length refers to a distance between the object-side surface 31 of the first lens element 3 and the image plane 100 at the optical axis (I).

In this embodiment, each of the object-side surfaces 31-71 and the image-side surfaces 32-72 is aspherical, and satisfies the relationship of $$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

where:

R represents a radius of curvature of an aspherical surface;

Z represents a depth of the aspherical surface, which is defined as a perpendicular distance between an arbitrary point on the aspherical surface that is spaced apart from the optical axis (I) by a distance Y, and a tangent plane at a vertex of the aspherical surface at the optical axis (I);

Y represents a perpendicular distance between the arbitrary point on the aspherical surface and the optical axis (I);

K represents a conic constant; and $a_{2i}$ represents a $2i^{th}$ aspherical coefficient.

Shown in FIG. 4 is a table that lists values of some aspherical coefficients of the aforementioned relationship (1) corresponding to the first preferred embodiment.

Relationships among some of the lens parameters corresponding to the first preferred embodiment are listed in columns of FIGS. 38 and 39 corresponding to the first preferred embodiment, where:

T1 represents a thickness of the first lens element 3 at the optical axis (I);

T2 represents a thickness of the second lens element 4 at the optical axis (I);

T3 represents a thickness of the third lens element 5 at the optical axis (I);

T4 represents a thickness of the fourth lens element 6 at the optical axis (I);

T5 represents a thickness of the fifth lens element 7 at the optical axis (I);

G12 represents an air gap length between the first lens element 3 and the second lens element 4 at the optical axis (I);

G23 represents an air gap length between the second lens element 4 and the third lens element 5 at the optical axis (I);

G34 represents an air gap length between the third lens element 5 and the fourth lens element 6 at the optical axis (I);

G45 represents an air gap length between the fourth lens element 6 and the fifth lens element 7 at the optical axis (I);

Gaa represents a sum of the four air gap lengths among the first lens element 3, the second lens element 4, the third lens element 5, the fourth lens element 6 and the fifth lens element 7 at the optical axis (I), i.e., the sum of G12, G23, G34 and G45;

ALT represents a sum of the thicknesses of the lens elements 3-7 at the optical axis (I), i.e., the sum of T1, T2, T3, T4 and T5; and BFL represents a distance at the optical axis (I) between the image-side surface 72 of the fifth lens element 7 and an image plane 100 at the image side.

FIGS. 5(a) to 5(d) respectively show simulation results corresponding to longitudinal spherical aberration, sagittal astigmatism aberration, tangential astigmatism aberration, and distortion aberration of the first preferred embodiment. In each of the simulation results, curves corresponding respectively to wavelengths of 470 nm, 555 nm, and 650 nm are shown.

Figure 5:
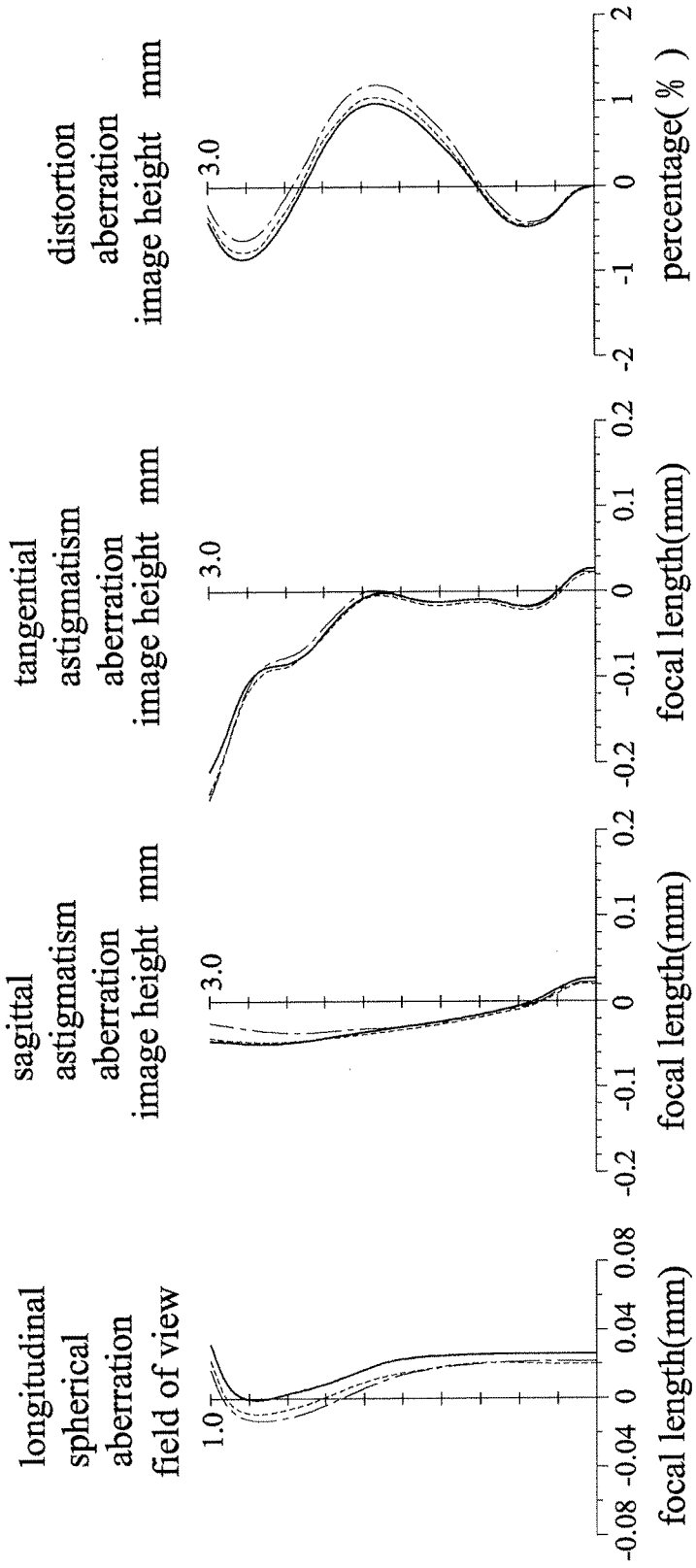
FIGS. 5(a) to 5(d) show different optical characteristics of the imaging lens of the first preferred embodiment.

It can be understood from FIG. 5(a) that, since each of the curves corresponding to longitudinal spherical aberration has a focal length at each field of view (indicated by the vertical axis) that falls within the range of ±0.04 mm, the first preferred embodiment is able to achieve a relatively low spherical aberration at each of the wavelengths. Furthermore, since the curves at each field of view are close to each other, the first preferred embodiment has a relatively low chromatic aberration.

It can be understood from FIGS. 5(b) and 5(c) that, since each of the curves falls within the range of ±0.3 mm of focal length, the first preferred embodiment has a relatively low optical aberration.

Moreover, as shown in FIG. 5(d), since each of the curves corresponding to distortion aberration falls within the range of ±1.5%, the first preferred embodiment is able to meet requirements in imaging quality of most optical systems.

In view of the above, even with the system length reduced down to below 4.671 mm, the imaging lens 10 of the first preferred embodiment is still able to achieve a relatively good optical performance.

Figure 6:
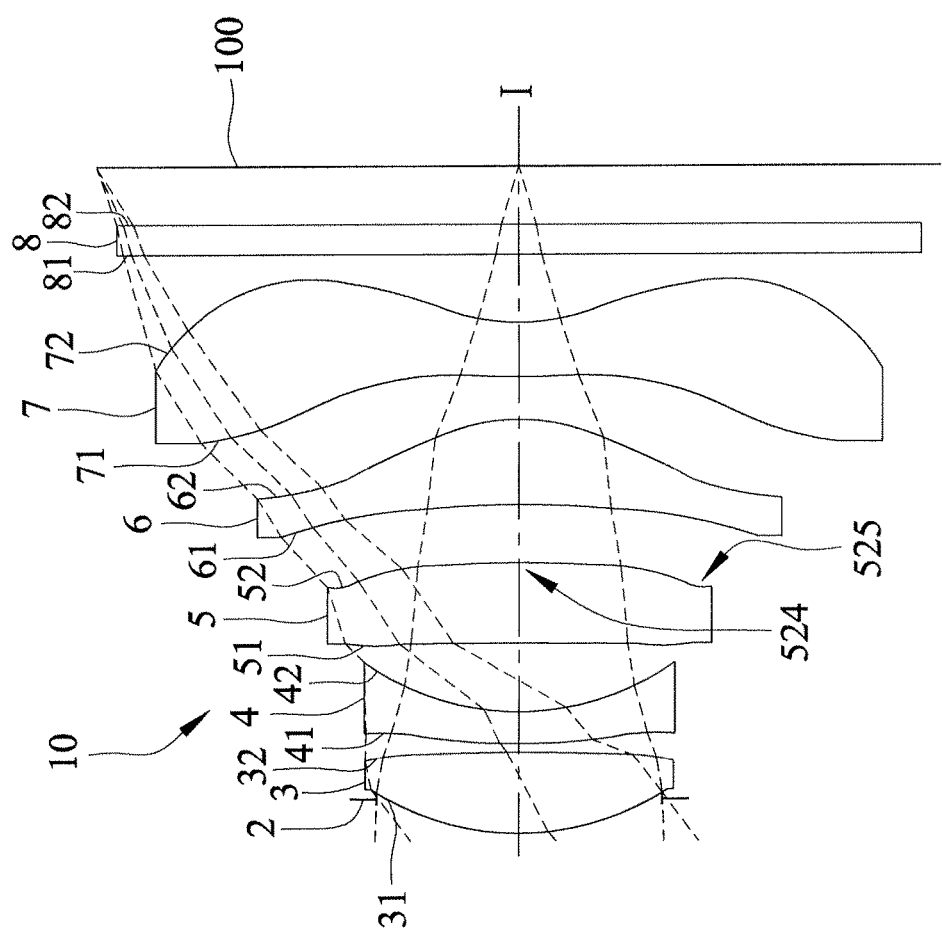
FIG. 6 is a schematic diagram that illustrates the second preferred embodiment of an imaging lens according to the present invention.
Figure 9:
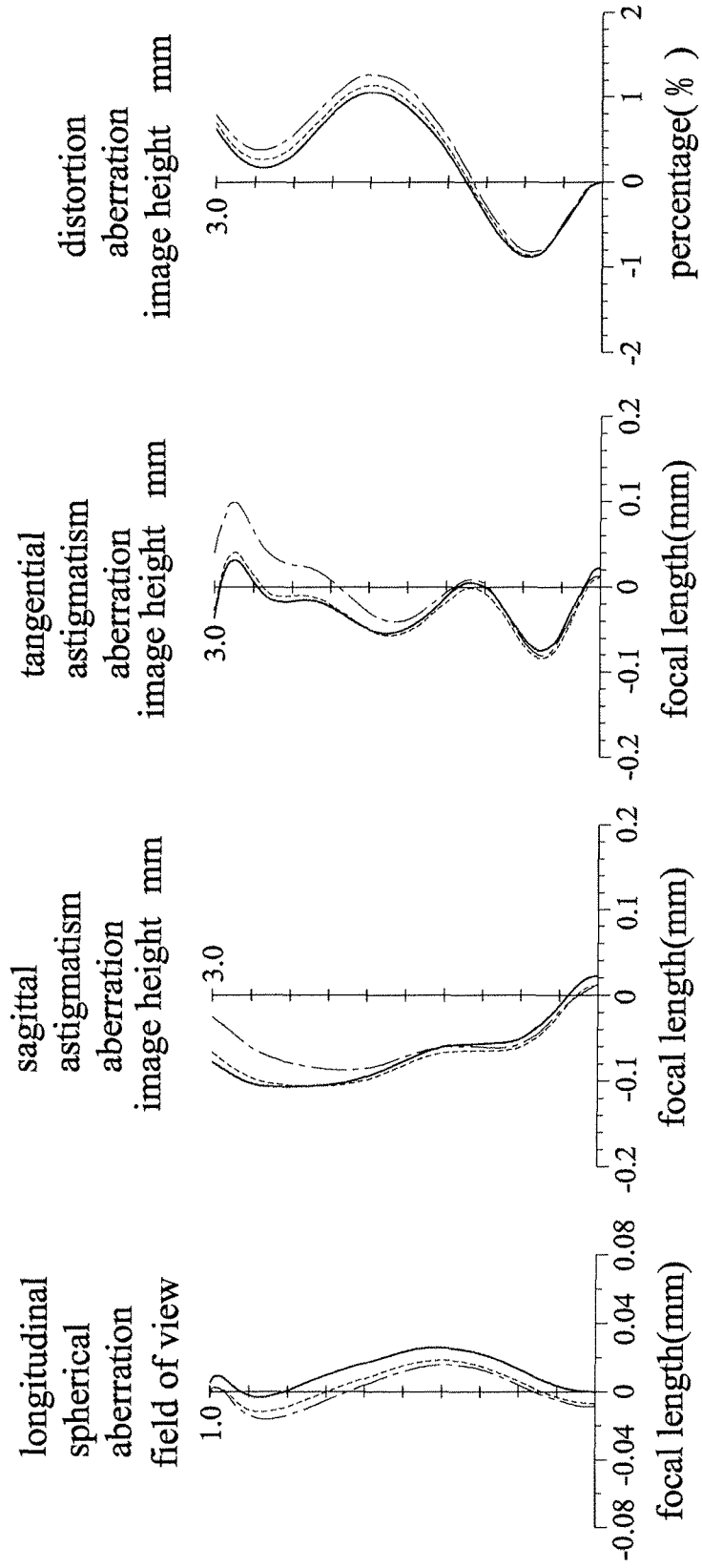
FIGS. 9(a) to 9(d) show different optical characteristics of the imaging lens of the second preferred embodiment.

Referring to FIG. 6, the differences between the first and second preferred embodiments of the imaging lens 10 of this invention reside in that: in the second preferred embodiment, the image-side surface 52 of the third lens element 5 has a convex portion 524 in a vicinity of the optical axis (I), and a concave portion 525 in a vicinity of the periphery of the third lens element 5. In FIG. 6, the reference numerals of the concave portions and the convex portions that are the same as those of the first preferred embodiment are omitted for the sake of clarity.

Shown in FIG. 7 is a table that lists values of some optical data corresponding to the surfaces 31-81, 32-82 of the second preferred embodiment. The imaging lens 10 has an overall system focal length of 3.708 mm, an HFOV of 38.980°, an F-number of 1.8, and a system length of 4.773 mm.

Shown in FIG. 8 is a table that lists values of some aspherical coefficients of the aforementioned relationship (1) corresponding to the second preferred embodiment.

Relationships among some of the aforementioned lens parameters corresponding to the second preferred embodiment are listed in columns of FIGS. 38 and 39 corresponding to the second preferred embodiment. FIGS. 9(a) to 9(d) respectively show simulation results corresponding to longitudinal spherical aberration, sagittal astigmatism aberration, tangential astigmatism aberration, and distortion aberration of the second preferred embodiment. It can be understood from FIGS. 9(a) to 9(d) that the second preferred embodiment is able to achieve a relatively good optical performance.

Figure 10:
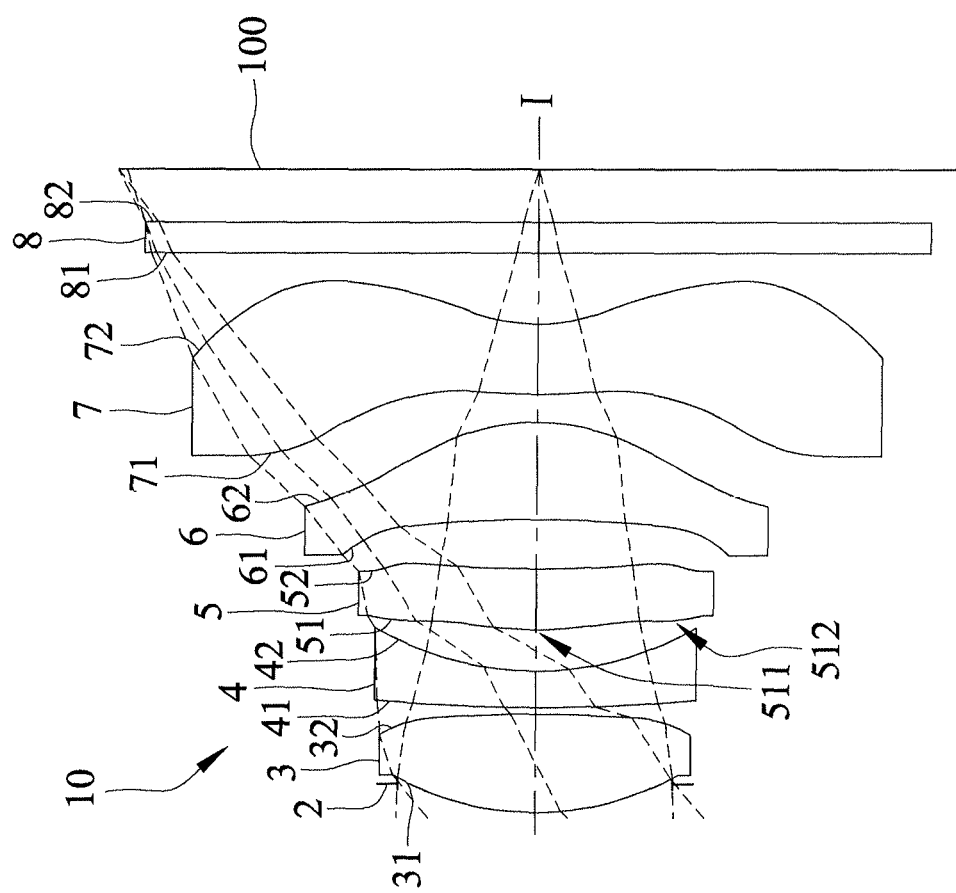
FIG. 10 is a schematic diagram that illustrates the third preferred embodiment of an imaging lens according to the present invention.
Figure 13:
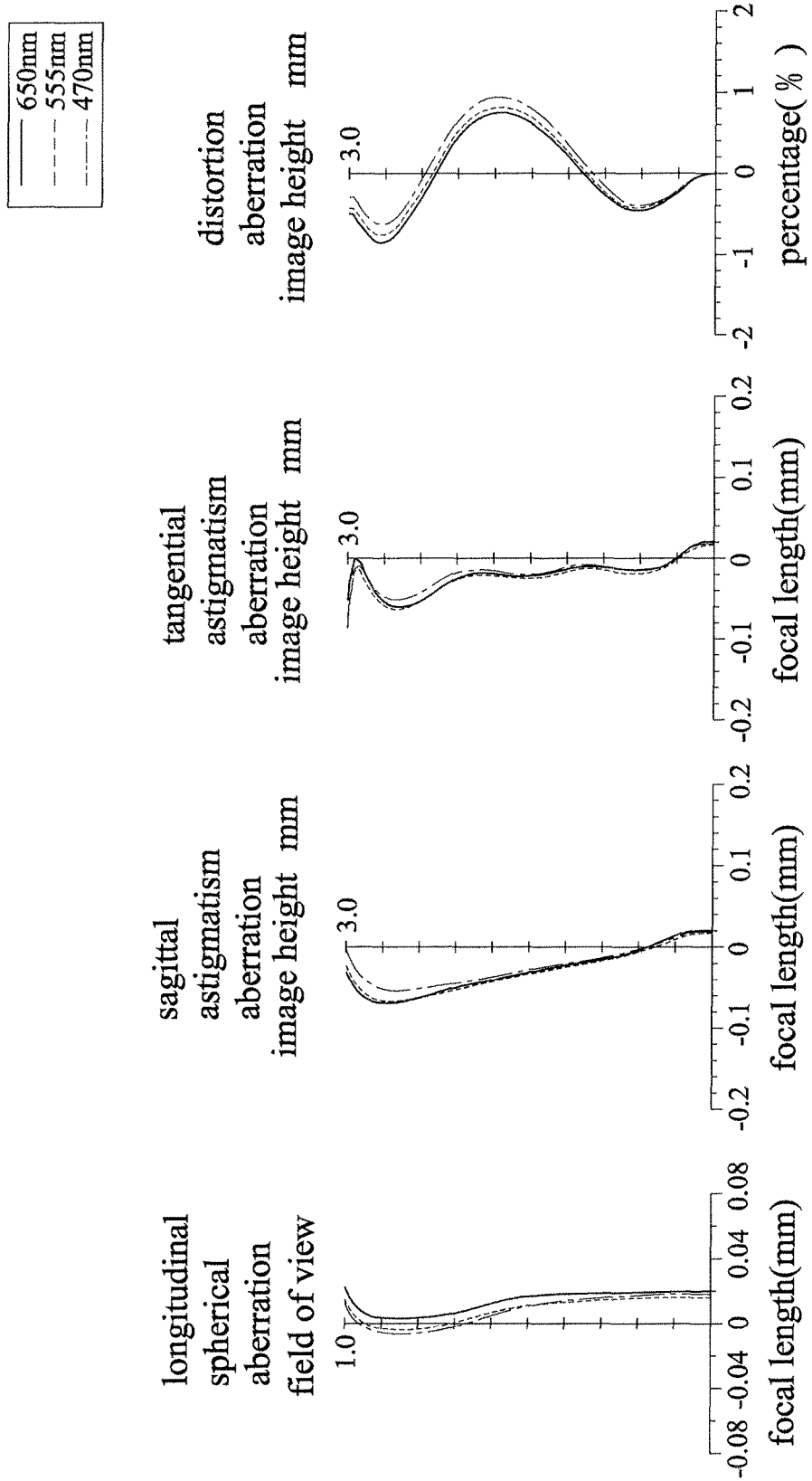
FIGS. 13(a) to 13(d) show different optical characteristics of the imaging lens of the third preferred embodiment.

Referring to FIG. 10, the differences between the first and third preferred embodiments of the imaging lens 10 of this invention reside in that: in the third preferred embodiment, the object-side surface 51 of the third lens element 5 is a convex surface that has a convex portion 511 in a vicinity of the optical axis (I), and a convex portion 512 in a vicinity of the periphery of the third lens element 5. In FIG. 10, the reference numerals of the concave portions and the convex portions that are the same as those of the first preferred embodiment are omitted for the sake of clarity.

Shown in FIG. 11 is a table that lists values of some optical data corresponding to the surfaces 31-81, 32-82 of the third preferred embodiment. The imaging lens 10 has an overall system focal length of 3.522 mm, an HFOV of 40.72°, an F-number of 1.8, and a system length of 4.549 mm.

Shown in FIG. 12 is a table that lists values of some aspherical coefficients of the aforementioned relationship (1) corresponding to the third preferred embodiment.

Relationships among some of the aforementioned lens parameters corresponding to the third preferred embodiment are listed in columns of FIGS. 38 and 39 corresponding to the third preferred embodiment.

FIGS. 13(a) to 13(d) respectively show simulation results corresponding to longitudinal spherical aberration, sagittal astigmatism aberration, tangential astigmatism aberration, and distortion aberration of the third preferred embodiment. It can be understood from FIGS. 13(a) to 13(d) that the third preferred embodiment is able to achieve a relatively good optical performance.

Figure 14:
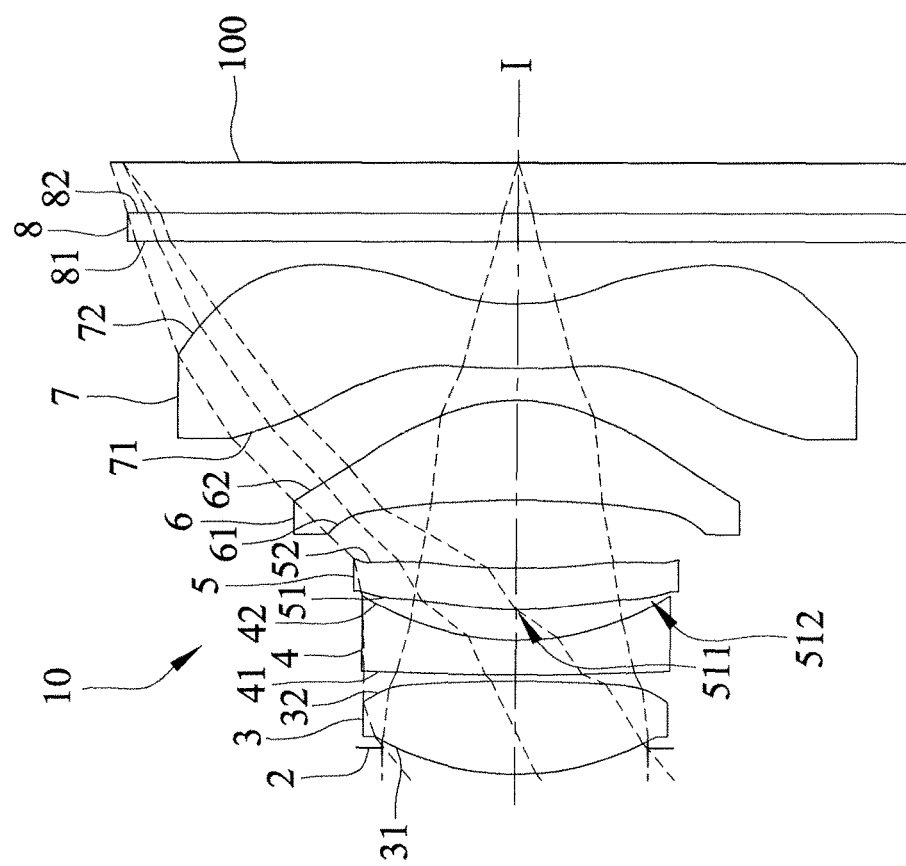
FIG. 14 is a schematic diagram that, illustrates the fourth preferred embodiment of an imaging lens according to the present invention.
Figures 17A, 17B, 17C, 17D:
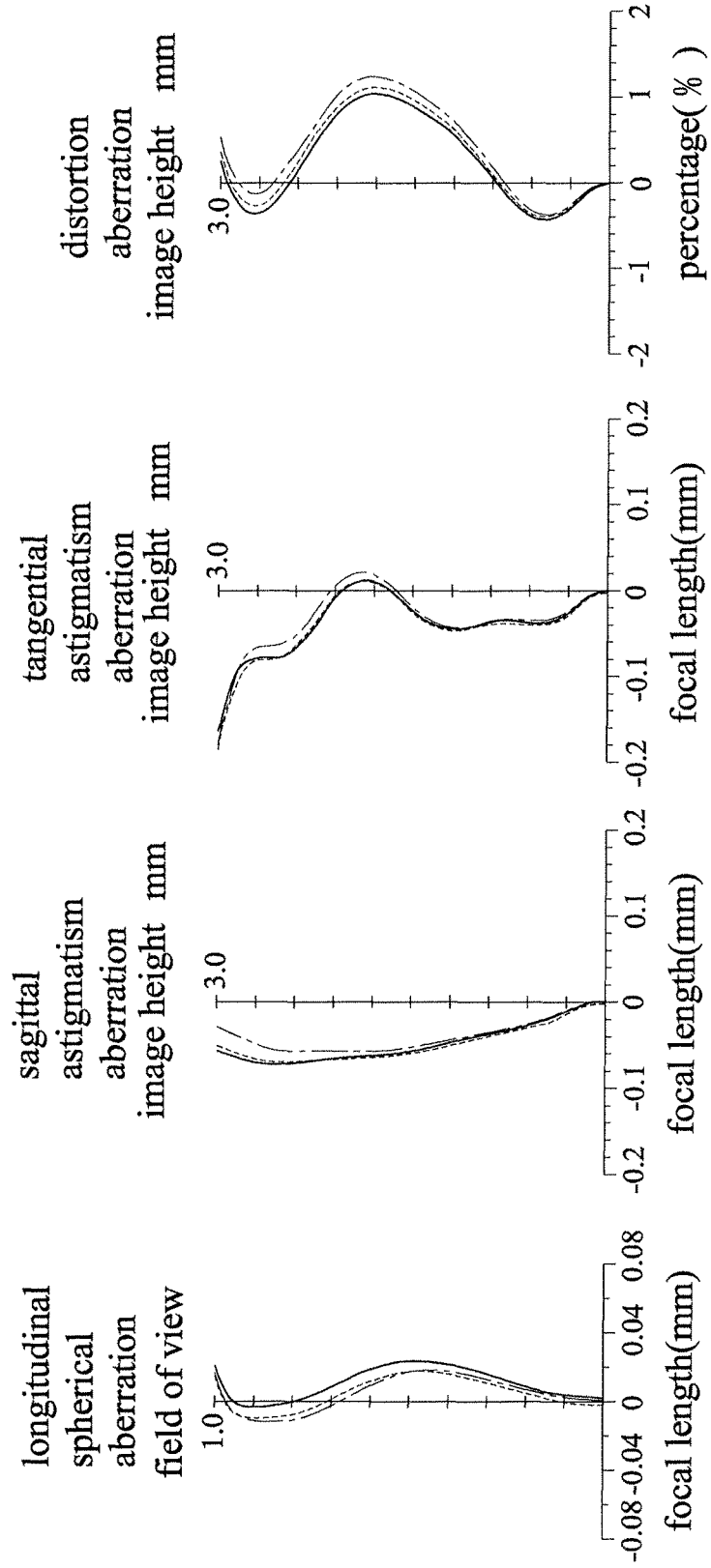
FIGS. 17(*a*) to 17(*d*) show different optical characteristics of the imaging lens of the fourth preferred embodiment.

Referring to FIG. 14, the fourth preferred embodiment of the imaging lens 10 of this invention has a configuration similar to that of the third preferred embodiment, that is, the object-side surface 51 of the third lens element 5 is a convex surface that has a convex portion 511 in a vicinity of the optical axis (I), and a convex portion 512 in a vicinity of the periphery of the third lens element 5. In addition, some of the optical data corresponding to the surfaces 31-81, 32-82, the lens parameters, and the aspherical coefficients of the lens elements 3-7 are different from those of the third preferred embodiment. In FIG. 14, the reference numerals of the concave portions and the convex portions that are the same as those of the first preferred embodiment are omitted for the sake of clarity.

Shown in FIG. 15 is a table that lists values of some optical data corresponding to the surfaces 31-81, 32-82 of the fourth preferred embodiment. The imaging lens 10 has an overall system focal length of 3.660 mm, an HFOV of 39.340°, an F-number of 1.8, and a system length of 4.683 mm.

Shown in FIG. 16 is a table that lists values of some aspherical coefficients of the aforementioned relationship (1) corresponding to the fourth preferred embodiment.

Relationships among some of the aforementioned lens parameters corresponding to the fourth preferred embodiment are listed in columns of FIGS. 38 and 39 corresponding to the fourth preferred embodiment.

FIGS. 17(a) to 17(d) respectively show simulation results corresponding to longitudinal spherical aberration, sagittal astigmatism aberration, tangential astigmatism aberration, and distortion aberration of the fourth preferred embodiment. It can be understood from FIGS. 17(a) to 17(d) that the fourth preferred embodiment is able to achieve a relatively good optical performance.

Figure 18:
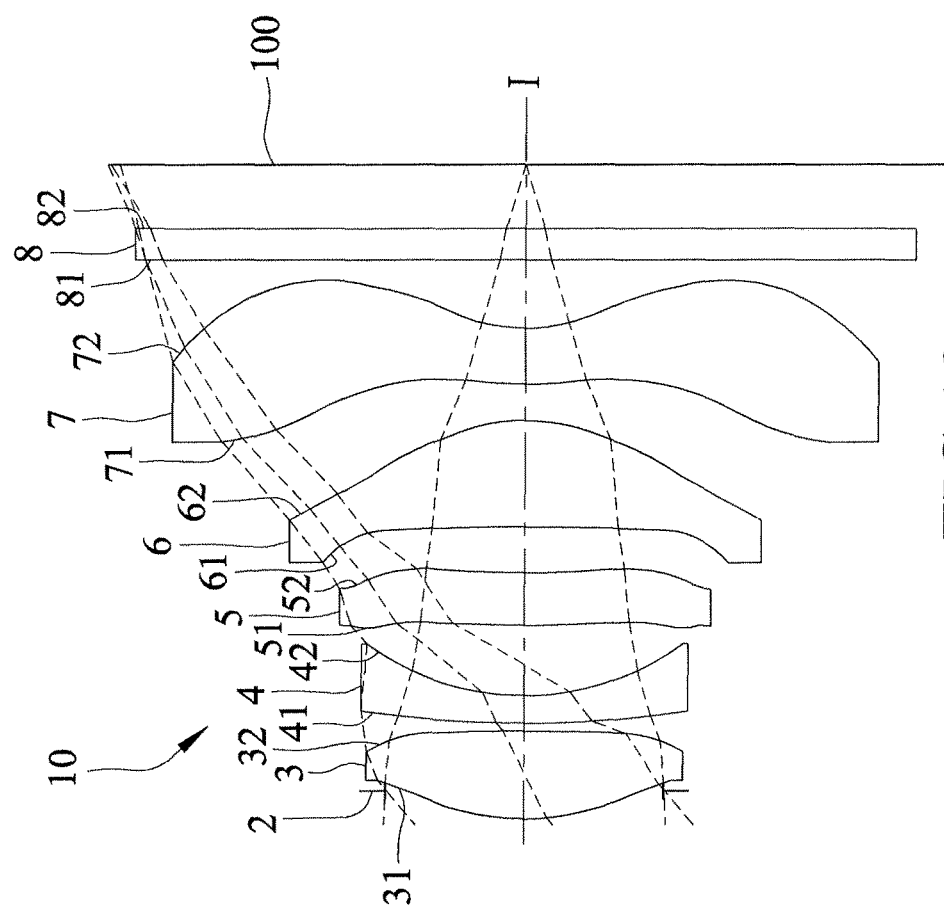
FIG. 18 is a schematic diagram that illustrates the fifth preferred embodiment of an imaging lens according to the present invention.
Figure 21:
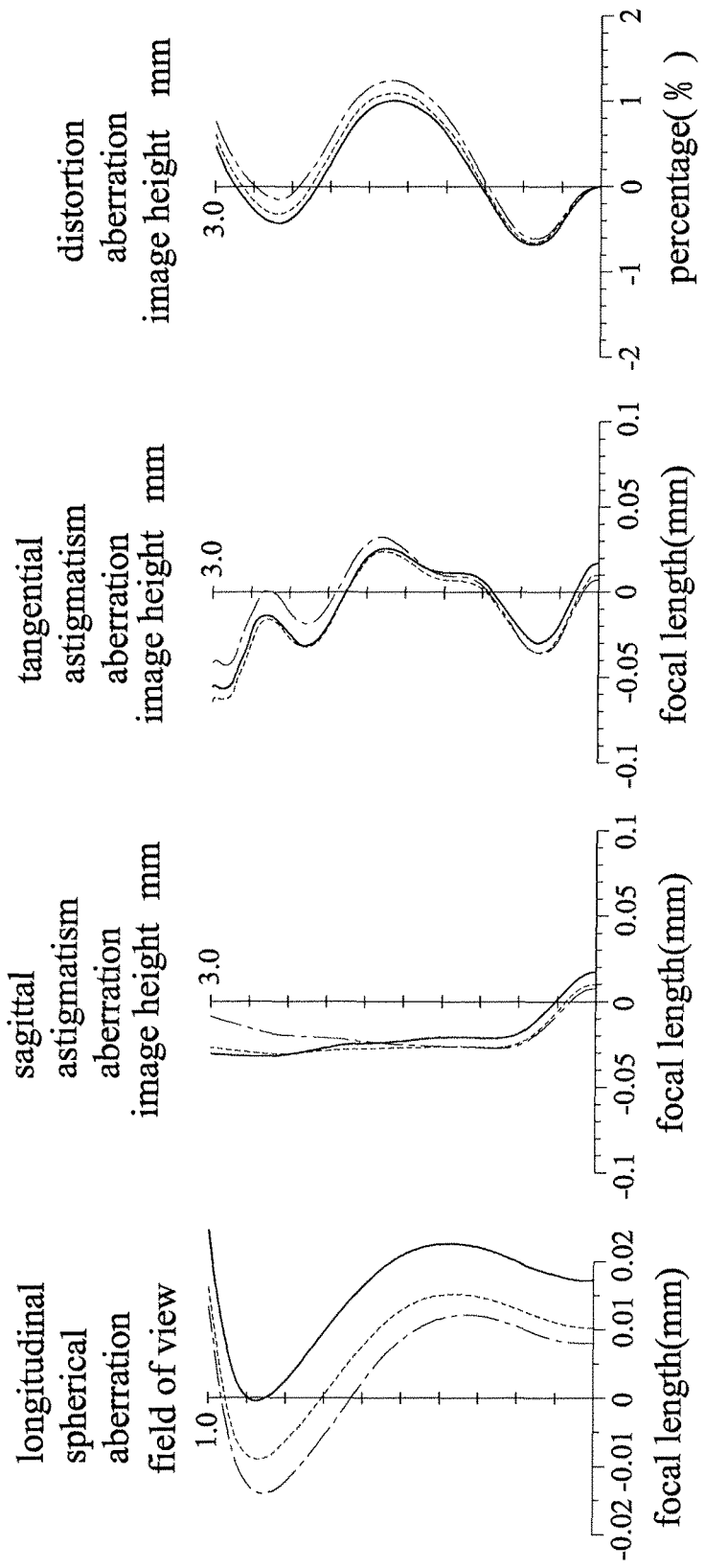
FIGS. 21(*a*) to 21(*d*) show different optical characteristics of the imaging lens of the fifth preferred embodiment.

FIG. 18 illustrates the fifth preferred embodiment of an imaging lens 10 according to the present invention, which has a configuration similar to that of the first preferred embodiment. The differences between the first and fifth preferred embodiments of the imaging lens 10 of this invention reside in some of the optical data, the aspherical coefficients and the lens parameters of the lens elements 3-7. In FIG. 18, the reference numerals of the concave portions and the convex portions that are the same as those of the first preferred embodiment are omitted for the sake of clarity.

Shown in FIG. 19 is a table that lists values of some optical data corresponding to the surfaces 31-81, 32-82 of the fifth preferred embodiment. The imaging lens 10 has an overall system focal length of 3.618 mm, an HFOV of 39.670°, an F-number of 1.8, and a system length of 4.687 mm.

Shown in FIG. 20 is a table that lists values of some aspherical coefficients of the aforementioned relationship (1) corresponding to the fifth preferred embodiment.

Relationships among some of the aforementioned lens parameters corresponding to the fifth preferred embodiment are listed in columns of FIGS. 38 and 39 corresponding to the fifth preferred embodiment.

FIGS. 21(a) to 21(d) respectively show simulation results corresponding to longitudinal spherical aberration, sagittal astigmatism aberration, tangential astigmatism aberration, and distortion aberration of the fifth preferred embodiment.

It can be understood from FIGS. 21(a) to 21(d) that the fifth preferred embodiment is able to achieve a relatively good optical performance.

Figure 22:
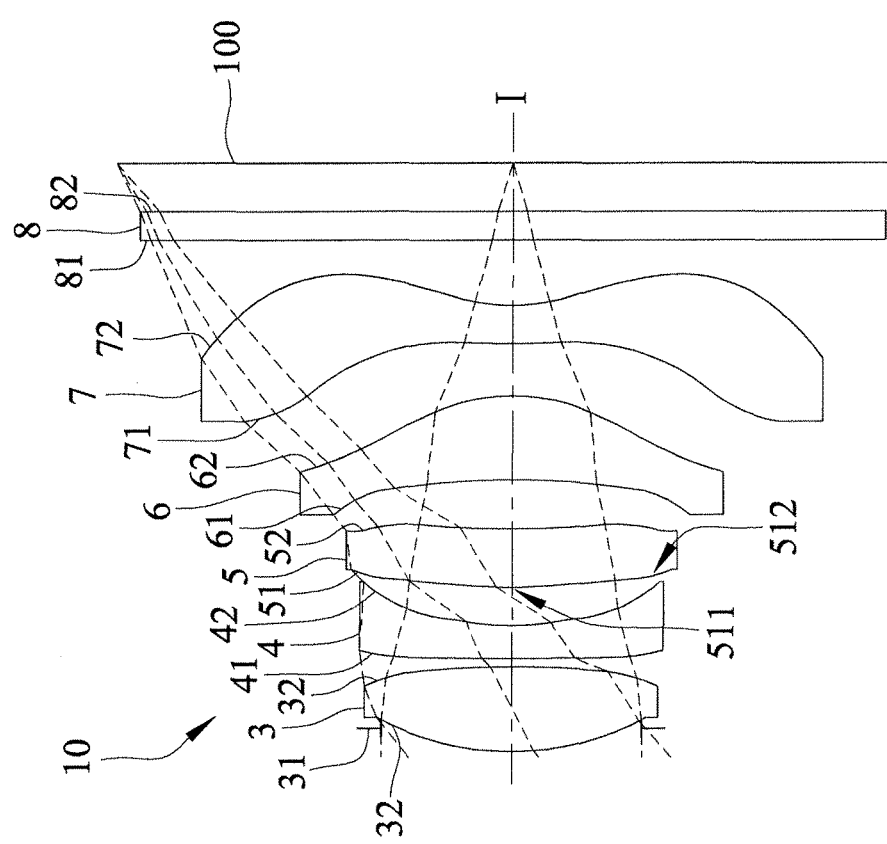
FIG. 22 is a schematic diagram that illustrates the sixth preferred embodiment of an imaging lens according to the present invention.
Figure 25:
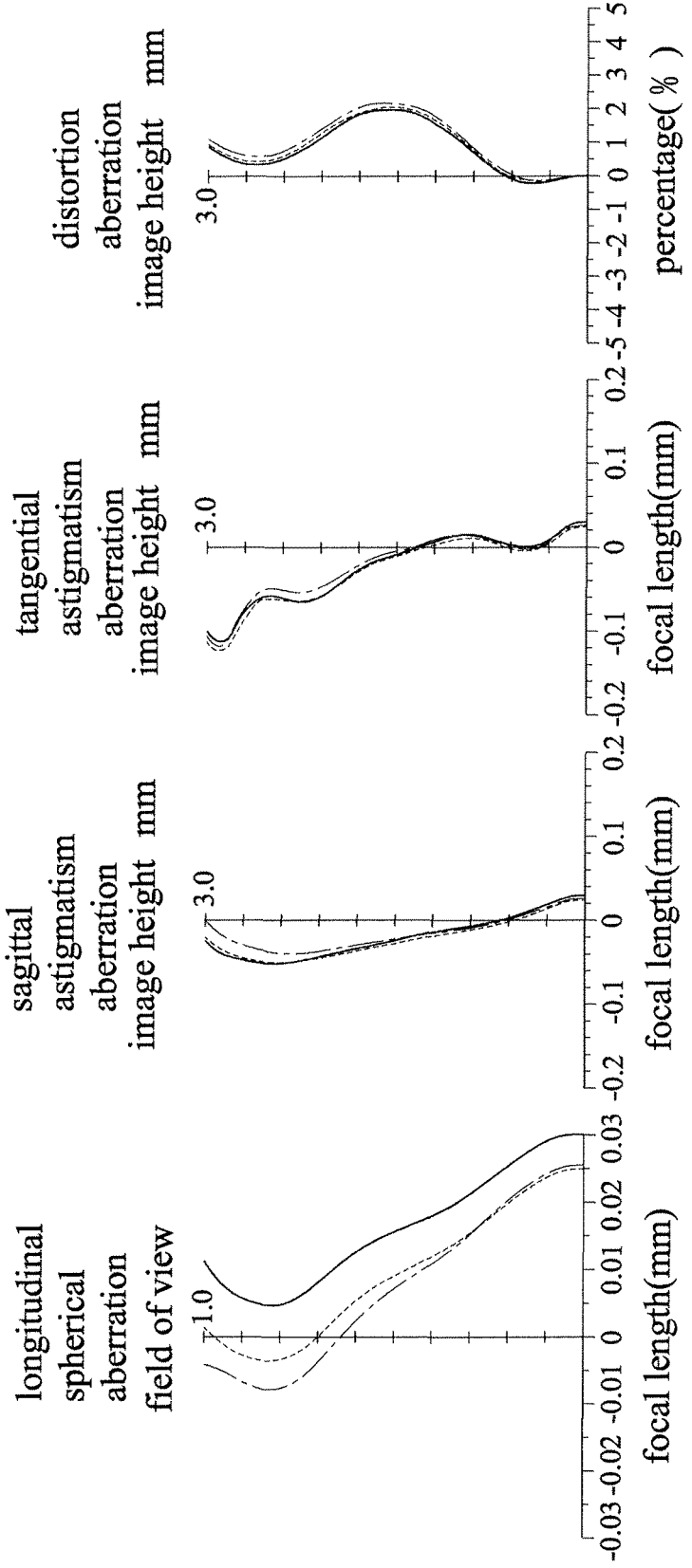
FIGS. 25(*a*) to 25(*d*) show different optical characteristics of the imaging lens of the sixth preferred embodiment.

FIG. 22 illustrates the sixth preferred embodiment of an imaging lens 10 according to the present invention, which has a configuration similar to that of the third preferred embodiment. The differences between the third and sixth preferred embodiments of the imaging lens 10 of this invention reside in some of the optical data, the aspherical coefficients and the lens parameters of the lens elements 3-7. In FIG. 22, the reference numerals of the concave portions and the convex portions that are the same as those of the first preferred embodiment are omitted for the sake of clarity.

Shown in FIG. 23 is a table that lists values of some optical data corresponding to the surfaces 31-81, 32-82 of the sixth preferred embodiment. The imaging lens 10 has an overall system focal length of 3.546 mm, an HFOV of 40.230°, an F-number of 1.8, and a system length of 4.452 mm.

Shown in FIG. 24 is a table that lists values of some aspherical coefficients of the aforementioned relationship (1) corresponding to the sixth preferred embodiment.

Relationships among some of the aforementioned lens parameters corresponding to the sixth preferred embodiment are listed in columns of FIGS. 38 and 39 corresponding to the sixth preferred embodiment.

FIGS. 25(a) to 25(d) respectively show simulation results corresponding to longitudinal spherical aberration, sagittal astigmatism aberration, tangential astigmatism aberration, and distortion aberration of the sixth preferred embodiment. It can be understood from FIGS. 25(a) to 25(d) that the sixth preferred embodiment is able to achieve a relatively good optical performance.

Figure 26:
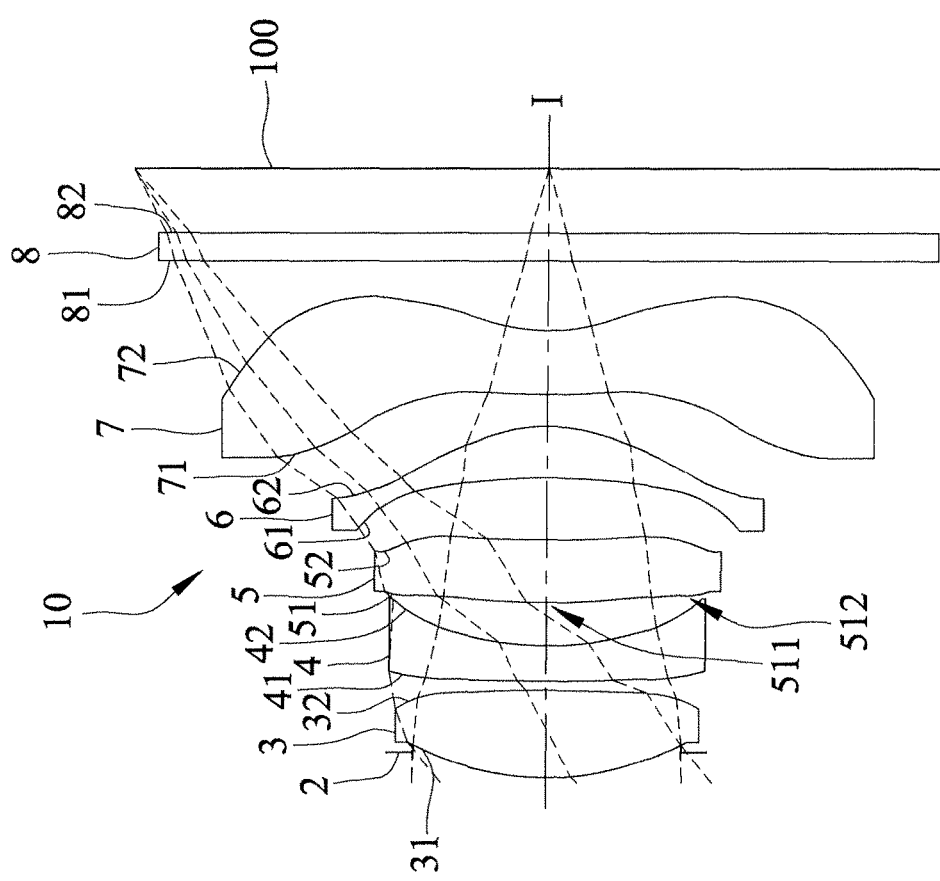
FIG. 26 is a schematic diagram that illustrates the seventh preferred embodiment of an imaging lens according to the present invention.
Figure 29:
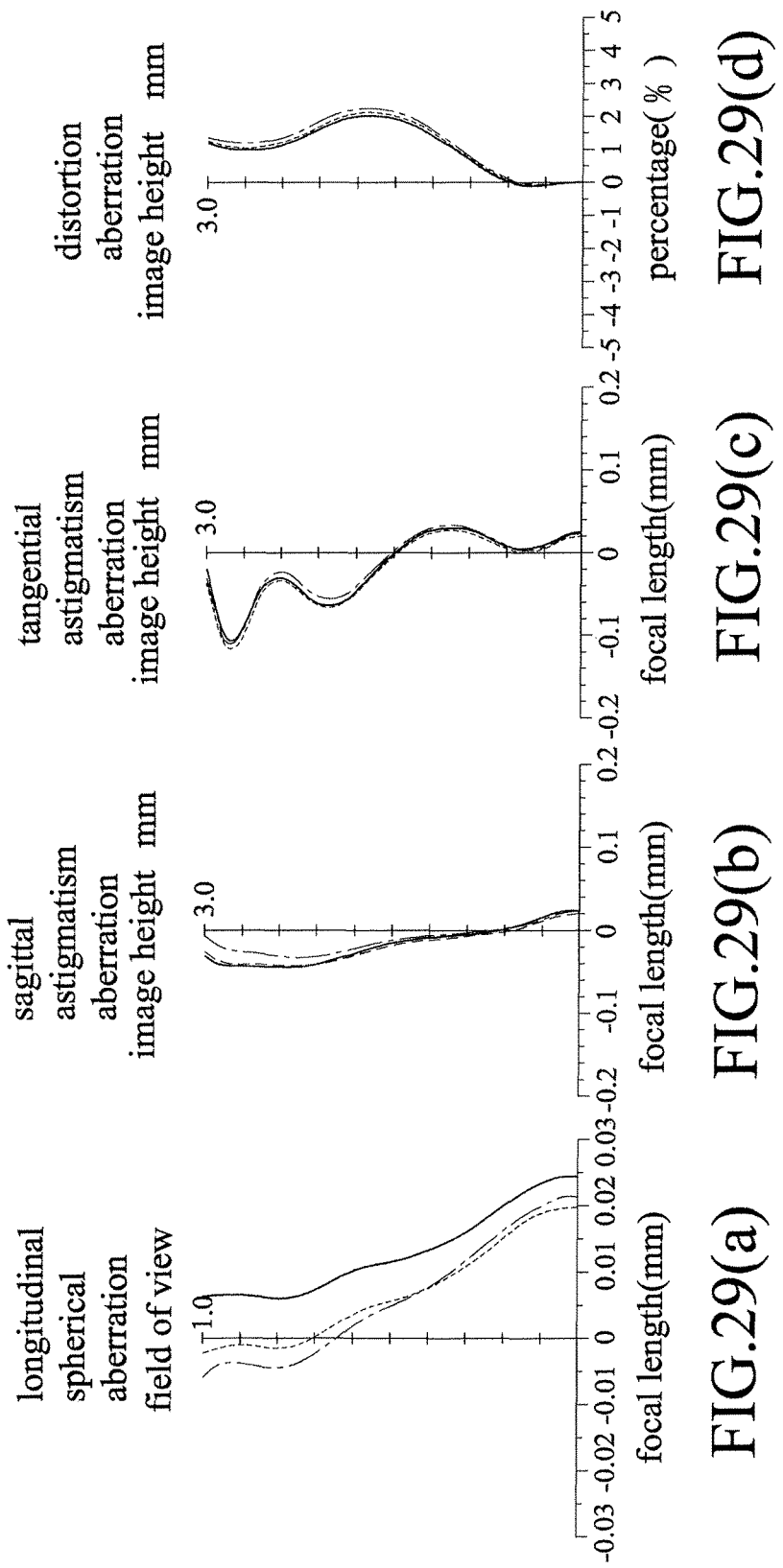
FIGS. 29(*a*) to 29(*d*) show different optical characteristics of the imaging lens of the seventh preferred embodiment.

FIG. 26 illustrates the seventh preferred embodiment of an imaging lens 10 according to the present invention, which has a configuration similar to that of the third preferred embodiment. The differences between the third and seventh preferred embodiments of the imaging lens 10 of this invention reside in some of the optical data, the aspherical coefficients and the lens parameters of the lens elements 3-7. In FIG. 26, the reference numerals of the concave portions and the convex portions that are the same as those of the first preferred embodiment are omitted for the sake of clarity.

Shown in FIG. 27 is a table that lists values of some optical data corresponding to the surfaces 31-81, 32-82 of the seventh preferred embodiment. The imaging lens 10 has an overall system focal length of 3.552 mm, an HFOV of 40.190°, an F-number of 1.8, and a system length of 4.438 mm.

Shown in FIG. 28 is a table that lists values of some aspherical coefficients of the aforementioned relationship (1) corresponding to the seventh preferred embodiment.

Relationships among some of the aforementioned lens parameters corresponding to the seventh preferred embodiment are listed in columns of FIGS. 38 and 39 corresponding to the seventh preferred embodiment.

FIGS. 29(a) to 29(d) respectively show simulation results corresponding to longitudinal spherical aberration, sagittal astigmatism aberration, tangential astigmatism aberration, and distortion aberration of the seventh preferred embodiment. It can be understood from FIGS. 29(a) to 29(d) that the seventh preferred embodiment is able to achieve a relatively good optical performance.

Figure 30:
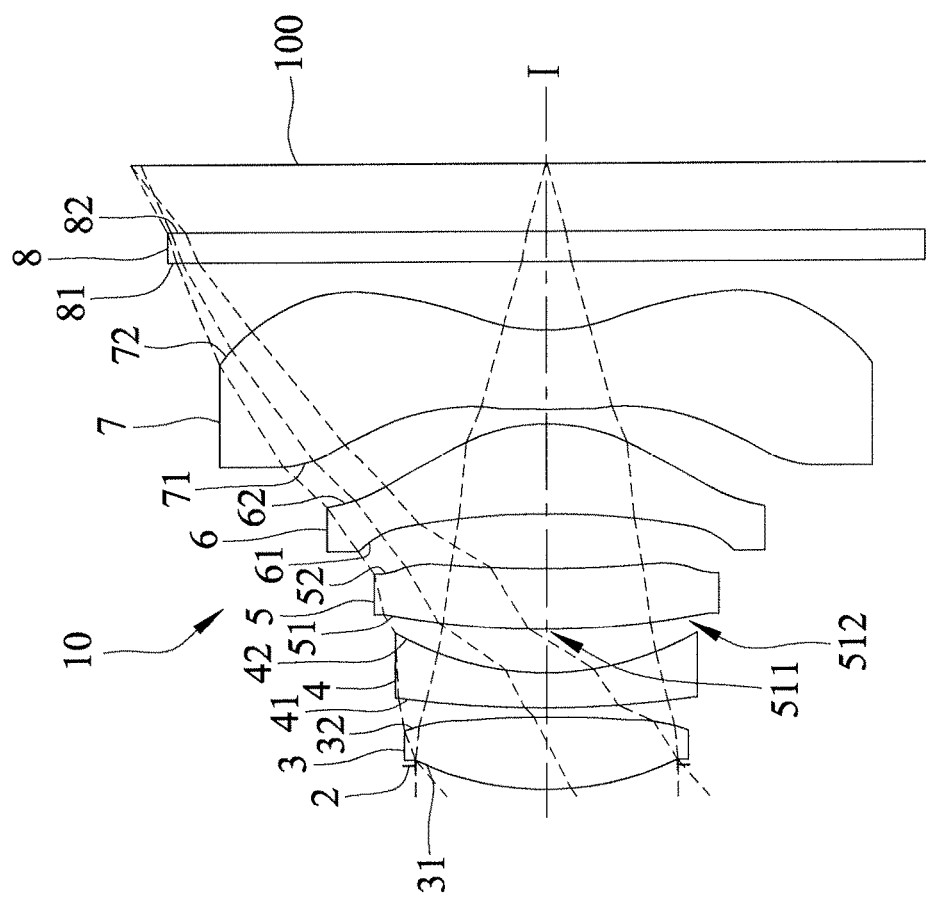
FIG. 30 is a schematic diagram that illustrates the eighth preferred embodiment of an imaging lens according to the present invention.
Figures 33A, 33B, 33C, 33D:
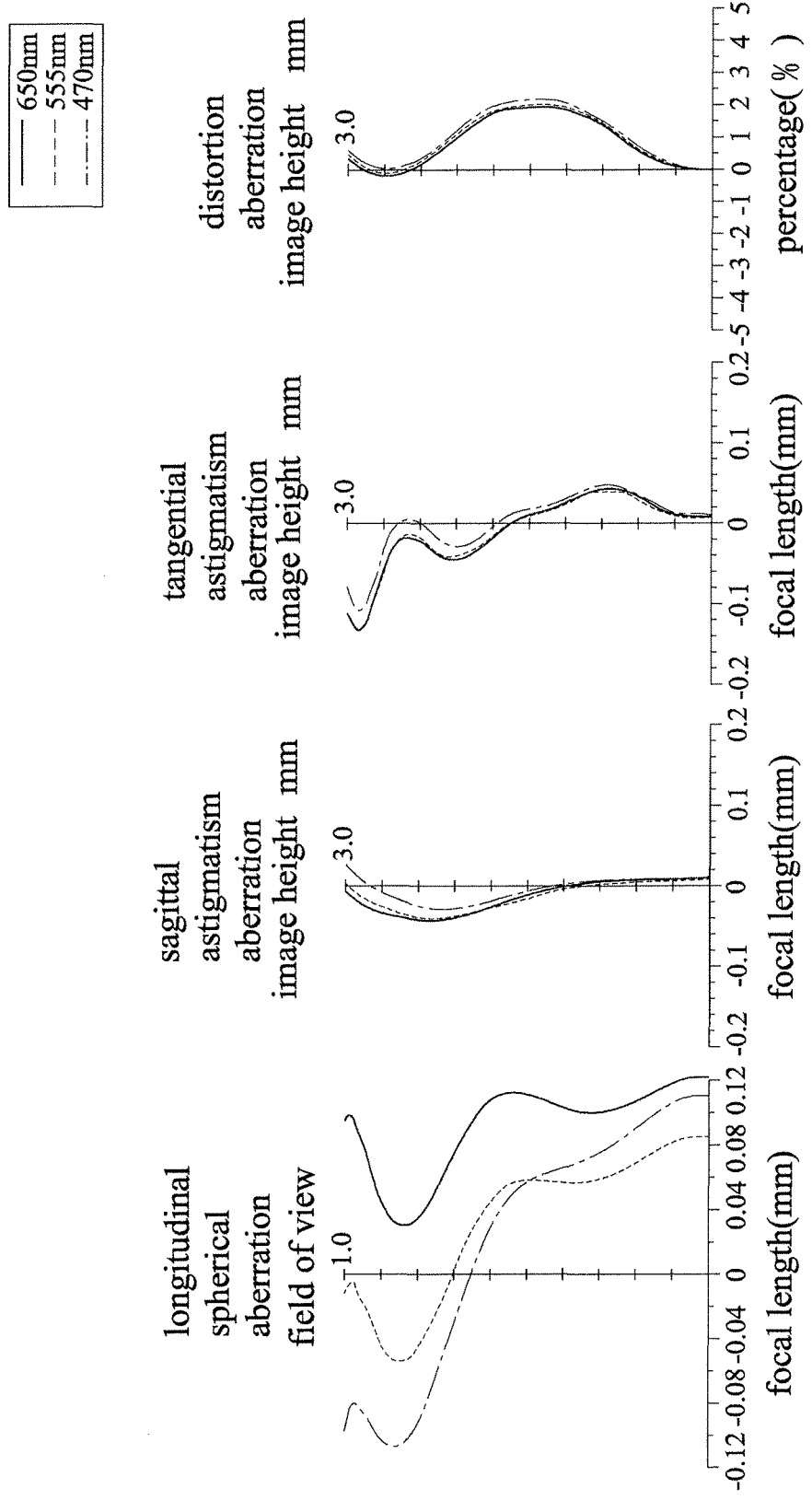
FIGS. 33(*a*) to 33(*d*) show different optical characteristics of the imaging lens of the eighth preferred embodiment.

FIG. 30 illustrates the eighth preferred embodiment of an imaging lens 10 according to the present invention, which has a configuration similar to that of the third preferred embodiment. The differences between the third and eighth preferred embodiments of the imaging lens 10 of this invention reside in some of the optical data, the aspherical coefficients and the lens parameters of the lens elements 3-7. In FIG. 30, the reference numerals of the concave portions and the convex portions that are the same as those of the first preferred embodiment are omitted for the sake of clarity.

Shown in FIG. 31 is a table that lists values of some optical data corresponding to the surfaces 31-81, 32-82 of the eighth preferred embodiment. The imaging lens 10 has an overall system focal length of 3.408 mm, an HFOV of 41.360°, an F-number of 1.8, and a system length of 4.506 mm.

Shown in FIG. 32 is a table that lists values of some aspherical coefficients of the aforementioned relationship (1) corresponding to the eighth preferred embodiment.

Relationships among some of the aforementioned lens parameters corresponding to the eighth preferred embodiment are listed in columns of FIGS. 38 and 39 corresponding to the eighth preferred embodiment.

FIGS. 33(a) to 33(d) respectively show simulation results corresponding to longitudinal spherical aberration, sagittal astigmatism aberration, tangential astigmatism aberration, and distortion aberration of the eighth preferred embodiment. It can be understood from FIGS. 33(a) to 33(d) that the eighth preferred embodiment is able to achieve a relatively good optical performance.

Figure 34:
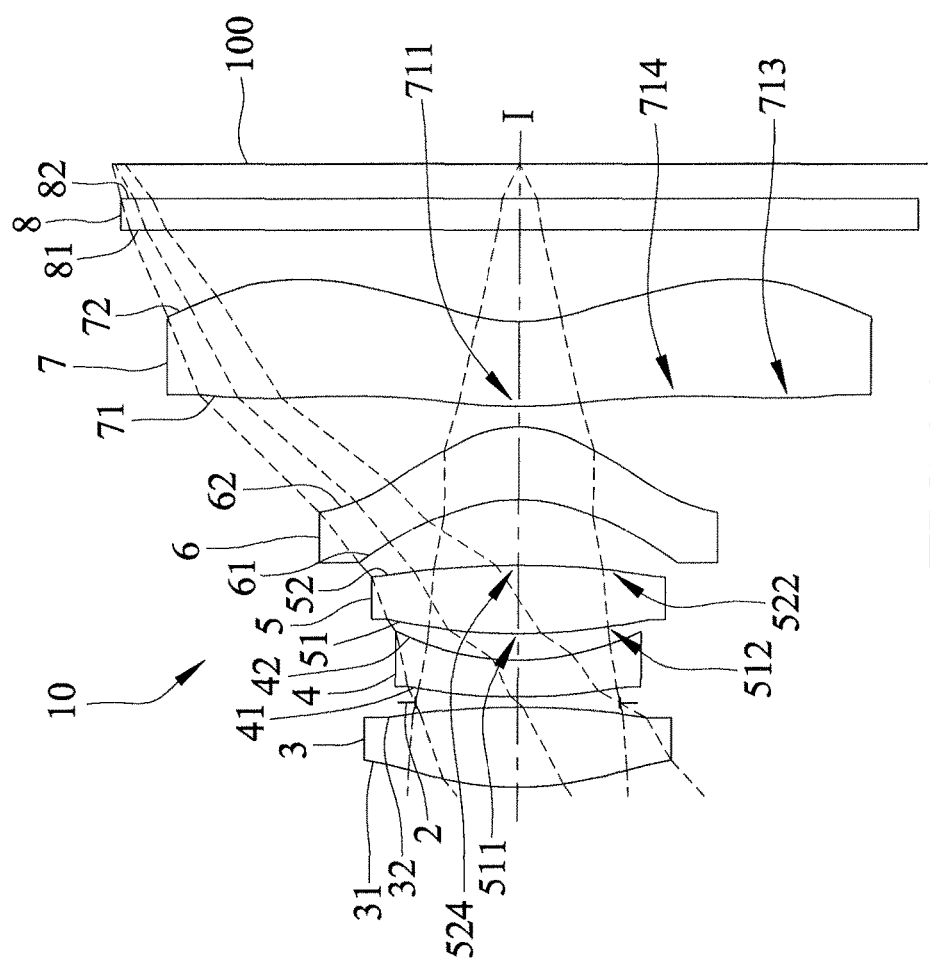
FIG. 34 is a schematic diagram that illustrates the ninth preferred embodiment of an imaging lens according to the present invention.
Figure 37:
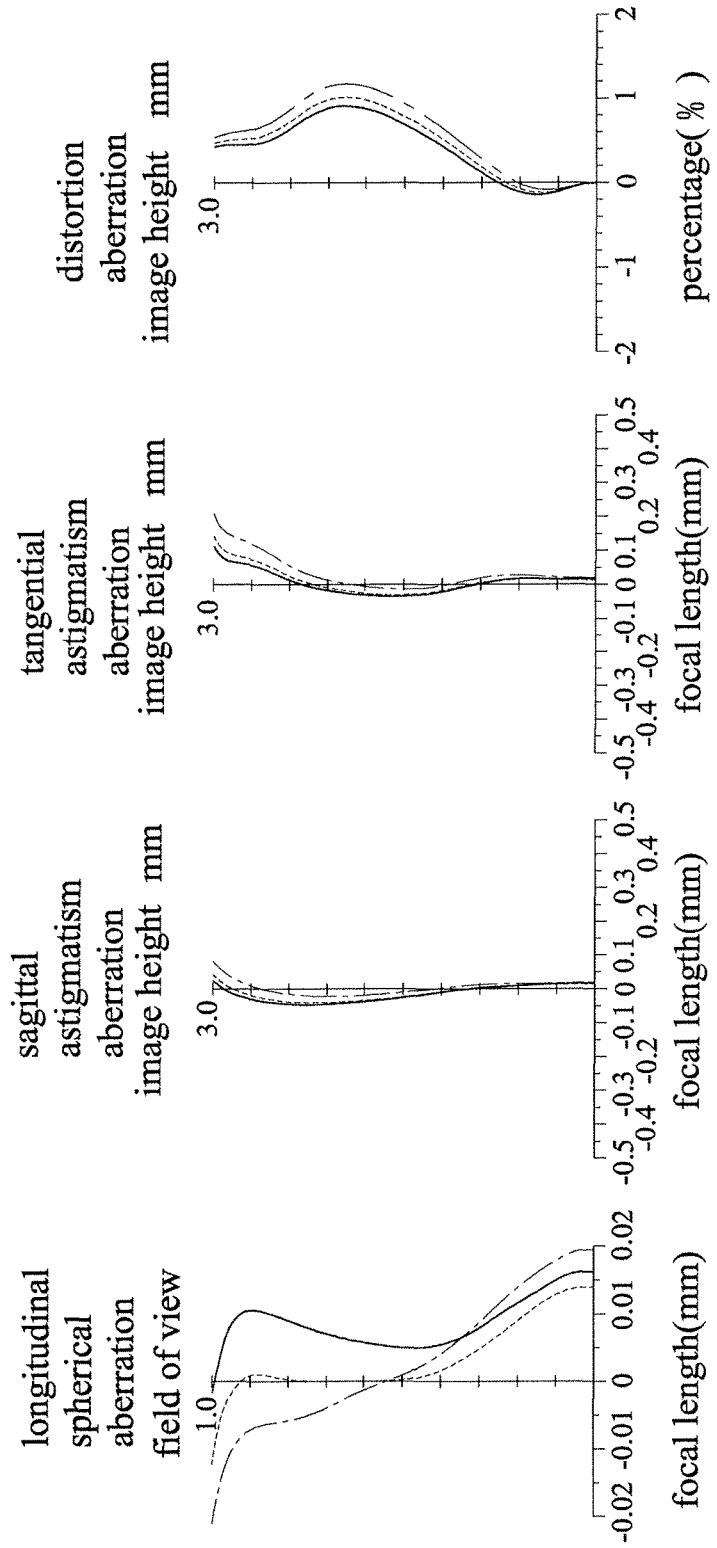
FIGS. 37(*a*) to 37(*d*) show different optical characteristics of the imaging lens of the ninth preferred embodiment.

Referring to FIG. 34, the differences between the first preferred embodiment and the ninth preferred embodiment of the imaging lens 10 of this invention reside in that, in the ninth preferred embodiment, the aperture stop 2 is disposed between the first lens element 3 and the second lens element 4. The object-side surface 51 of the third lens element 5 is a convex surface that has a convex portion 511 in the vicinity of the optical axis (I), and a convex portion 512 in the vicinity of the periphery of the third lens element 5. The image-side surface 52 of the third lens element 5 has a convex portion 524 in a vicinity of the optical axis (I), and a concave portion 522 in a vicinity of the periphery of the third lens element 5. The object-side surface 71 of the fifth lens element 7 has a convex portion 711 in a vicinity of the optical axis (I), a convex portion 713 in a vicinity of the periphery of the fifth lens element 7, and a concave portion 714 disposed between the convex portion 711 and the convex portion 713. In FIG. 34, the reference numerals of the concave portions and the convex portions that are the same as those of the first preferred embodiment are omitted for the sake of clarity.

Shown in FIG. 35 is a table that lists values of some optical data corresponding to the surfaces 31-81, 32-82 of the ninth preferred embodiment. The imaging lens 10 has an overall system focal length of 3.485 mm, an HFOV of 40.720°, an F-number of 2.20, and a system length of 4.620 mm.

Shown in FIG. 36 is a table that lists values of some aspherical coefficients of the aforementioned relationship (1) corresponding to the ninth preferred embodiment.

Relationships among some of the aforementioned lens parameters corresponding to the ninth preferred embodiment are listed in columns of FIGS. 38 and 39 corresponding to the ninth preferred embodiment.

FIGS. 37(a) to 37(d) respectively show simulation results corresponding to longitudinal spherical tangential astigmatism aberration, and distortion aberration of the ninth preferred embodiment. It can be understood from FIGS. 37(a) to 37(d) that the ninth preferred embodiment is able to achieve a relatively good optical performance.

Shown in FIGS. 38 and 39 are tables that list the aforesaid relationships among some of the aforementioned lens parameters corresponding to the nine preferred embodiments for comparison. It should be noted that the values of the lens parameters and the relationships listed in FIGS. 38 and 39 are rounded off to the third decimal place.

When each of the lens parameters of the imaging lens 10 according to this invention satisfies the following optical relationships, the optical performance is still relatively good even with the reduced system length:

(1) ALT/G34≤7.70 and ALT/G45≤16.50: Appropriately reducing ALT is advantageous for reduction of the overall system length of the imaging lens 10. However, in consideration of facilitating assembly, each of G34 and G45 requires a certain length. In order to reduce the overall system length of the imaging lens 10, each of ALT/G34 and ALT/G45 tends to have a relatively small value in design. Specifically, when ALT/G45≤10.5, G45 is relatively large so as to facilitate assembly. Preferably, 4.00≤ALT/G34≤7.70 and 5.00≤ALT/G45≤16.50.

(2) BFL/G45≤10.5, BFL/T4≤3.40, BFL/T1≤2.35, BFL/G34≤3.60, BFL/T3≤3.90, EFL/T4≤9.50, and EFL/G45≤18.00: Reducing EFL and BFL is advantageous for reduction of the overall system length of the imaging lens 10. However, in consideration of facilitating assembly, each of G34 and G45 requires a certain length. T1, T3, and T4 are limited due to lens manufacturing techniques. When BFL/G45, BFL/T4, BFL/T1, BFL/G34, BFL/T3, EFL/T4, and EFL/G45 tend to have relatively smaller values in design, better arrangements among EFL, BFL, G45, G34, T1, T3, and T4 may be achieved while the system length of the imaging lens 10 is reduced, so that the imaging lens 10 may still have good imaging quality. Preferably, 2.00≤BFL/G45≤10.5, 1.00≤BFL/T4≤3.40, 1.00≤BFL/T1≤2.35, 1.50≤BFL/G34≤3.60, 1.50≤BFL/T3≤3.90, 4.00≤EFL/T4≤9.50, and 7.00≤EFL/G45≤18.00.

(3) 5.60≤EFL/T5≤13.00: Reducing EFL is advantageous for reduction of the overall system length of the imaging lens 10. In addition, since the fifth lens element 7 has the largest optical effective diameter among the lens elements 3-7, reducing T5 is advantageous for reduction of the overall system length of the imaging lens 10. Better arrangement may be achieved when this relationship is satisfied.

(4) Gaa/T5≥1.80, T5/G45≤5.00, and T5/T1≤1.20: Since the fifth lens element 7 has the largest optical effective diameter, it is designed to be thicker for facilitating production. However, reducing T5 is beneficial to reduction of the overall system length of the imaging lens 10. Therefore, better arrangement among Gaa, G45, T1, and T5 may be achieved when Gaa/T5 tends to have a relatively larger value and each of T5/G45 and T5/T1 tends to have a relatively smaller value in design. Preferably, 1.80≤Gaa/T5≤4.30, 0.30≤T5/G45≤5.00, and 0.20≤T5/T1≤1.20.

To sum up, effects and advantages of the imaging lens 10 according to the present invention are described hereinafter.

1. By virtue of the convex portion 322, the convex portion 412, the concave portion 421, the concave portion 522, the concave portion 611 and the concave portion 721, optical aberration of the image may be corrected, thereby ensuring image quality of the imaging lens 10. With further cooperation from the convex portion 512, correction of optical aberration of the image may be further enhanced. Since the fifth lens element 7 is made of a plastic material, weight and cost of the imaging lens 10 may be reduced, and the fifth lens element 7 may be easily made to be aspherical. With further cooperation from the aperture stop 2 disposed at the object side of the first lens element 3, reduction of the overall system length of the imaging lens 10 is made more effective.

2. Through design of the relevant optical data, optical aberrations, such as spherical aberration, may be reduced or even eliminated. Further, through surface design and arrangement of the lens elements 3-7, even with the system length reduced, optical aberrations may still be reduced or even eliminated, resulting in relatively good optical performance.

3. Through the aforesaid nine preferred embodiments, it is known that the system length of this invention may be reduced down to below 5 mm, so as to facilitate developing thinner relevant products with economic benefits.

Figure 40:
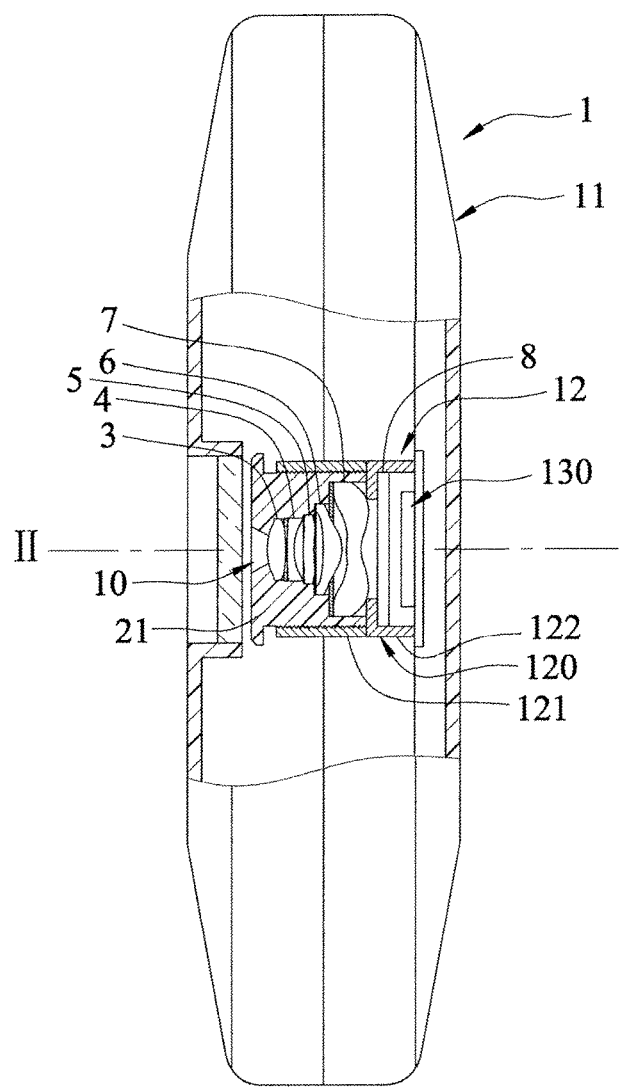
FIG. 40 is a schematic partly sectional view to illustrate a first exemplary application of the imaging lens of the present invention.

Shown in FIG. 40 is a first exemplary application of the imaging lens 10, in which the imaging lens 10 is disposed in a housing 11 of an electronic apparatus 1 (such as a mobile phone, but not limited thereto), and forms a part of an imaging module 12 of the electronic apparatus 1.

The imaging module 12 includes a barrel 21 on which the imaging lens 10 is disposed, a holder unit 120 on which the barrel 21 is disposed, and an image sensor 130 disposed at the image plane 100 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 41:
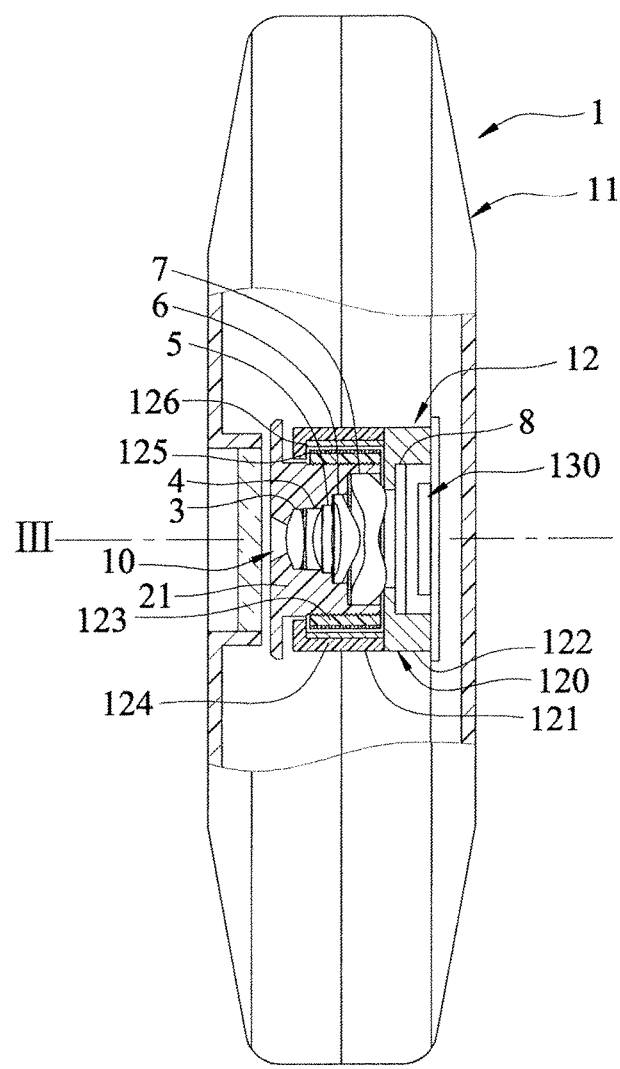
FIG. 41 is a schematic partly sectional view to illustrate a second exemplary application of the imaging lens of the present invention.

Shown in FIG. 41 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 8 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising a first lens element, a second lens element, a third lens element, a fourth lens element and a fifth lens element arranged in order from an object side to an image side along an optical axis of said imaging lens, each of said first lens element, said second lens element, said third lens element, said fourth lens element and said fifth lens element having a refractive power, an object-side surface facing toward the object side, and an image-side surface facing toward the image side, wherein:

said image-side surface of said first lens element has a convex portion in a vicinity of a periphery of said first lens element;

said object-side surface of said second lens element has a convex portion in a vicinity of the optical axis and a convex portion in a vicinity of a periphery of said second lens element, and said image-side surface of said second lens element has a concave portion in a vicinity of the optical axis;

said image-side surface of said third lens element has a concave portion in a vicinity of a periphery of said third lens element, and said object-side surface of said third lens element has a convex portion in a vicinity of the optical axis;

said object-side surface of said fourth lens element has a concave portion in a vicinity of the optical axis;

said fifth lens element is made of a plastic material, said image-side surface of said fifth lens element has a concave portion in a vicinity of the optical axis, and said object-side surface of said fifth lens element has a convex portion in a vicinity of the optical axis;

said imaging lens does not include any lens element with a refractive power other than said first lens element, said second lens element, said third lens element, said fourth lens element and said fifth lens element; and said imaging lens satisfies $ALT/G34 \leq 7.7$, $BFL/G45 \leq 10.5$ and $EFL/T4 \leq 9.5$, where ALT represents a sum of thicknesses of said first lens element, said second lens element, said third lens element, said fourth lens element and said fifth lens element at the optical axis, G34 represents an air gap length between said third lens element and said fourth lens element at the optical axis, BFL represents a distance at the optical axis between said image-side surface of said fifth lens element and an image plane at the image side, G45 represents an air gap length between said fourth lens element and said fifth lens element at the optical axis, EFL represents a system focal length of said imaging lens, and T4 represents the thickness of said fourth lens element at the optical axis.

2. The imaging lens as claimed in claim 1, further satisfying $5.6 \leq EFL/T5 \leq 13.0$, where T5 represents the thickness of said fifth lens element at the optical axis.

3. The imaging lens as claimed in claim 2, further satisfying $1.80 \leq Gaa/T5 \leq 4.30$, where Gaa represents a sum of four air gap lengths among said first lens element, said second lens element, said third lens element, said fourth lens element and said fifth lens element at the optical axis.

4. The imaging lens as claimed in claim 1, further comprising an aperture stop that is disposed at the object side of said first lens element.

5. The imaging lens as claimed in claim 1, further satisfying $BFL/T4 \leq 3.4$.

6. The imaging lens as claimed in claim 5, further satisfying $ALT/G45 \leq 10.5$.

7. The imaging lens as claimed in claim 1, further satisfying $T5/G45 \leq 5.0$, where T5 represents the thickness of said fifth lens element at the optical axis.

8. The imaging lens as claimed in claim 7, further satisfying $BFL/T1 \leq 2.35$, where T1 represents the thickness of said first lens element at the optical axis.

9. The imaging lens as claimed in claim 1, further satisfying $BFL/G34 \leq 3.6$.

10. The imaging lens as claimed in claim 9, further satisfying $EFL/G45 \leq 18.0$.

11. The imaging lens as claimed in claim 1, further satisfying $BFL/T3 \leq 3.9$, where T3 represents the thickness of said third lens element at the optical axis.

12. The imaging lens as claimed in claim 11, further satisfying $ALT/G45 \leq 16.5$.

13. The imaging lens as claimed in claim 12, further satisfying $T5/T1 \leq 1.2$, where T5 represents the thickness of said fifth lens element at the optical axis, and T1 represents the thickness of said first lens element at the optical axis.

14. The imaging lens as claimed in claim 13, wherein said object-side surface of said third lens element has a convex portion in a vicinity of a periphery of said third lens element.

15. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

16. The imaging lens as claimed in claim 1, wherein said fourth lens element has a positive refractive power.

* * * * *